(12) United States Patent
Carvey

(10) Patent No.: US 7,039,058 B2
(45) Date of Patent: *May 2, 2006

(54) SWITCHED INTERCONNECTION NETWORK WITH INCREASED BANDWIDTH AND PORT COUNT

(75) Inventor: Philip P. Carvey, Bedford, MA (US)

(73) Assignee: Avici Systems, Inc., North Billerica, MA (US)

( * ) Notice: Subject to any disclaimer, the term of this patent is extended or adjusted under 35 U.S.C. 154(b) by 981 days.

This patent is subject to a terminal disclaimer.

(21) Appl. No.: 09/904,009

(22) Filed: Jul. 12, 2001

(65) Prior Publication Data

US 2002/0051427 A1 May 2, 2002

Related U.S. Application Data

(63) Continuation-in-part of application No. 09/866,335, filed on May 25, 2001.

(60) Provisional application No. 60/234,399, filed on Sep. 21, 2000.

(51) Int. Cl.
*H04L 12/28* (2006.01)

(52) U.S. Cl. ............... 370/400; 370/251; 370/254

(58) Field of Classification Search ............ 370/401, 370/251, 254, 400
See application file for complete search history.

(56) References Cited

U.S. PATENT DOCUMENTS

| | | | | |
|---|---|---|---|---|
| 4,933,933 A | * | 6/1990 | Dally et al. | 370/406 |
| 5,125,076 A | * | 6/1992 | Faber et al. | 709/245 |
| 5,444,701 A | * | 8/1995 | Cypher et al. | 370/406 |
| 5,583,990 A | * | 12/1996 | Birrittella et al. | 712/29 |
| 6,169,741 B1 | * | 1/2001 | LeMaire et al. | 370/401 |
| 6,339,488 B1 | * | 1/2002 | Beshai et al. | 398/59 |
| 2002/0006112 A1 | * | 1/2002 | Jaber et al. | 370/238 |
| 2002/0044560 A1 | * | 4/2002 | Dally et al. | 370/401 |
| 2002/0048272 A1 | * | 4/2002 | Carvey | 370/400 |
| 2002/0073337 A1 | * | 6/2002 | Ioele et al. | 713/201 |
| 2003/0091049 A1 | * | 5/2003 | Abe et al. | 370/392 |

FOREIGN PATENT DOCUMENTS

| | | | |
|---|---|---|---|
| WO | WO 99/11/033 | * | 3/1999 |
| WO | WO 99/11033 | | 4/1999 |

* cited by examiner

*Primary Examiner*—Seema S. Rao
*Assistant Examiner*—Jay P. Patel
(74) *Attorney, Agent, or Firm*—Hamilton, Brook, Smith & Reynolds, P.C.

(57) ABSTRACT

A network is disclosed for interconnecting devices external to the network. Embodiments of the network include a plurality of switching nodes interconnected by links forming or capable of forming a Gamma graph interconnection network. Devices are coupled to the network via a plurality of ports. Furthermore, the network includes a plurality of Infiniband buses with each switching node coupled to at least one of the buses. Each Infiniband bus is capable of supporting a configurable number of ports such that the bandwidth of a port is inversely proportional to the number of ports configured per bus. The Gamma graph interconnection network of the router providing for high port counts and increased bandwidth availability. Furthermore, the use of industry standard buses, such as Infiniband buses, allow for the interconnection of multiple heterogeneous application specific modules to interface and communicate with one another.

20 Claims, 21 Drawing Sheets

| AB | AC | AD |
|---|---|---|
| AB → BC | AC → CB | AD → DB |
| AB → BD | AC → CD | AD → DC |
| AB → BA | AC → CA | AD → DA |

| BA | BC | BD |
|---|---|---|
| BA → AC | BC → CD | BD → DA |
| BA → AD | BC → CA | BD → DC |
| BA → AB | BC → CB | BD → DB |

| CA | CB | CD |
|---|---|---|
| CA → AB | CB → BD | CD → DA |
| CA → AD | CB → BA | CD → DB |
| CA → AC | CB → BC | CD → DC |

| DA | DB | DC |
|---|---|---|
| DA → AB | DB → BA | DC → CA |
| DA → AC | DB → BC | DC → CB |
| DA → AD | DB → BD | DC → CD |

FIG. 5B

| CONTROL STRUCTURE | SIZE (IN BITS) | DESCRIPTION |
|---|---|---|
| IngressPacketState | 1280x35=44,800 | EACH IngressPacketState STRUCTURE MANAGES THE STORAGE OF A PARTIALLY RECEIVED PACKET ON ONE OF THE INGRESS PORTS. |
| EgressLaneState | (128x30=3,480) | EACH EgressLaneState STRUCTURE SUPPLIES INFORMATION USED TO PROCESS RECEIVED CREDITS. |
| AvailableEgressLane | (128x1) | EACH FLAG INDICATES THAT A PARTICULAR LANE IS AVAILABLE OR IN USE. |
| FanState | (512x44=22,528) | EACH FanState STRUCTURE HOLDS ONE FAN WAITING TO BE CONVERTED INTO A FIR AND POINTERS WHICH ALLOW CREATING A LINKED LIST OF PACKETS WAITING ON A PARTICULAR CHANNEL AND A LINKED LIST OF FANs COMPRISING A PARTICULAR PACKET. |
| AvailableFanState | (512x1) | EACH FLAG INDICATES THAT A PARTICULAR LOCAL FANSTATE STRUCTURE IS AVAILABLE OR IN USE. |
| WaitingForLanes | (2928x1) | EACH FLAG INDICATES THAT A PARTICULAR TUNNEL SEGMENT HAS A PACKET READY TO BE ASSIGNED TO A LANE AS SOON AS ONE BECOMES AVAILABLE. |
| WaitingForFSM | (2928x1) | EACH FLAG INDICATES THAT A PARTICULAR CHANNEL HAS A FAN READY TO BE CONVERTED INTO A FIR AS SOON AS THE EgressController HAS BANDWIDTH AVAILABLE TO PERFORM THE CONVERSION. |
| WaitingForFirFifo | (2304x1) | EACH FLAG INDICATES THAT A PARTICULAR LANE HAS A FAN READY TO CONVERT INTO A FIR AS SOON AS ROOM IN THE FIR FIFO BECOMES NON-FULL. |
| SegmentPointer | (2938x13=38,194) | EACH SegmentPointer POINTS TO A QUEUE OF PACKETS WAITING ON A TUNNEL SEGMENT. |

FIG. 13

SWITCHED INTERCONNECTION NETWORK WITH INCREASED BANDWIDTH AND PORT COUNT

RELATED APPLICATION

This application is a continuation-in-part of application Ser. No. 09/866,335, filed May 25, 2001, which claims the benefit of U.S. Provisional Application No. 60/234,399, filed on Sep. 21, 2000. The entire teachings of the above applications are incorporated herein by reference.

BACKGROUND OF THE INVENTION

Interconnection networks are employed to forward messages between system elements in large computer and communication systems. The Internet is an interconnection network in which long messages are segmented into shorter units of information called packets which are then forwarded across the network independently through Internet routers. PCT Patent Application Serial No. PCT/US98/16762, entitled "Router with Virtual Channel Allocation," filed Aug. 20, 1998, and published as WO99/11033, teaches an Internet router that includes an internal interconnection network referred to as a fabric. Fabrics overcome the port and bandwidth limitations commonly associated with routers that are based on common bus or crossbar switch topologies.

FIG. 1 illustrates a two dimensional torus array network which may serve as a fabric. The fabric is composed of a number of nodes 40, referred to as fabric routers, which are interconnected by fabric links 45. A fabric connects a group of external links, each coupled to a fabric router, and performs message routing and forwarding among the links. Data packets may be segmented into fixed length blocks called flow control units or flits. Flits are forwarded across the fabric using a technique called wormhole routing such that the head flit of the packet establishes a path through the fabric that is followed by the remaining flits of the packet.

FIG. 2 illustrates packet traversal over a path through a fabric. A data packet arriving on an external link is forwarded through the fabric to an external destination link by transmitting the packet over a path comprising a series of interconnected fabric routers. For example, the data packet received on node (1,4) and destined for node (5,3) may traverse a path including nodes (1,4), (2,4), (2,3), (3,3), (4,3), and (5,3). The entire path can be computed by a fabric management microprocessor at the source node, which determines the most efficient path through the fabric. The calculated path is then specified within a fabric header appended to the packet. Alternatively, a path can be computed incrementally such that each path segment is determined by a fabric management processor at each fabric hop along the path to a destination link.

FIG. 3 illustrates a typical switch element of a fabric router for forwarding data packets. A fabric router typically includes one or more switch elements 41 for forwarding data packets. The switch forwards packets received on a switch ingress port to a switch egress port. The switch radix ($\Delta$) of a fabric corresponds to the number of fabric links 45 fanning into a switch as well as the number of fabric links 45 fanning out of the switch. For example, the switch radix is equal to 4 in FIG. 3. Fabric links fanning into a switch are connected via switch ingress ports, while fabric links fanning out of a switch are connected via switch egress ports. The remaining switch ingress ports and switch egress ports typically connect to external links (i.e., FABRIC IN and FABRIC OUT) coupled to the fabric via a line interface.

The total number of nodes in a fabric is called its size. Since the radix $\Delta$ of a switch is typically much smaller than the desired size in large fabrics, a packet will typically hop across multiple switch elements in order to traverse a fabric. The maximum number of links (i.e., hops) traversed by a packet from any source node to any destination node is called the diameter (D) of the fabric. Referring back to FIG. 2, the fabric size is 25 nodes and the diameter of the fabric is 8 hops. If the 25 nodes of FIG. 2 were connected in a torus as illustrated in FIG. 1, the diameter would be reduced to 4 hops.

When packets have random destinations, the aggregate fabric bandwidth must be greater than the product of average diameter ($D_{avg}$) multiplied by the aggregate ingress access bandwidth. Since the cost of a fabric is almost directly proportional to the aggregate fabric bandwidth required, fabric topologies which reduce the average diameter for a given size result in lower fabric costs.

SUMMARY OF THE INVENTION

Multicomputers and multiprocessors have for many years employed interconnection networks to send addresses and data for memory accesses between processors and memory banks or to send messages between processors (e.g., Inter-Processor Communication (IPC) messages). Early systems were constructed using bus and crossbar interconnects. However, to permit these machines to scale to larger numbers of processors, bus and crossbar interconnects were replaced with multi-hop direct and indirect interconnection networks. Recently, interconnection networks similar to those employed in multicomputer systems have been employed as switches and routers in the communication application space. For example, an Internet router, described in PCT Patent Application Serial No. PCT/US98/16762, entitled "Router with Virtual Channel Allocation," filed Aug. 20, 1998, and published as WO99/11033, is implemented by a three-dimensional torus array fabric.

Embodiments of the present invention include a network for interconnecting devices external to the network. In particular, the network includes a number of switching nodes that are interconnected by links forming or capable of forming a Gamma graph interconnection network. A large number of devices are coupled to the network by ports. Furthermore, each switching node is coupled to at least one bus, such as an Infiniband™ bus, which is capable of supporting a configurable number of ports, the bandwidth of a port being inversely proportional to the number of ports configured per bus.

In one embodiment, the Gamma graph interconnection network may have a diameter which is greater than its radix. As such, the interconnection network is link fault tolerant providing $\Delta-1$ alternative paths between any two devices. Thus, when a link fault occurs along a primary path between at least two devices through the fabric, packets can be routed over one of the $\Delta-1$ alternative paths through the interconnection network. These alternative paths typically have a hop distance greater than the diameter.

Furthermore, each switching node is interconnected to a subset of adjacent switching nodes such that each switching node has a bidirectional interconnection with one of the adjacent switching nodes with the remaining interconnections being primarily unidirectional.

When packets have random destinations, the aggregate fabric bandwidth of a network must be greater than the product of the average diameter of the fabric and the aggregate ingress access bandwidth. Since the cost of a fabric is almost directly proportional to the aggregate fabric bandwidth required, the reduction of the average diameter for a given size fabric results in lower fabric costs. Embodiments of a network implementing a Gamma graph interconnection network of switching nodes allows for networks having very large numbers of interconnected nodes with a minimal diameter.

For example, a Gamma graph network is described having a radix equal to 8 and the diameter equal to 4. In such an interconnection network 3,024 switching nodes can be interconnected. Assuming that at least 24 devices can be coupled to each switching node via ports and each port supports at least two logical data channels having a bandwidth of at least two gigabits per second, the Gamma graph network can provide a total bandwidth of at least 290 terabits per second.

Embodiments of Gamma graph networks can include six or more interconnected switching nodes. Having at least one device coupled to each switching node by a port and at least one logical data channel supported per port.

Embodiments of a switching node include a switch and at least one traffic manager coupled to the switch. The traffic manager can receive data packets from one or more devices coupled to the switching node and forwards at least portions of the packets into the interconnection network. The traffic manager can also buffer data packets in memory coupled to it. The traffic manager also can receive at least portions of data packets from the switch and forwards those packets out of the interconnection network to one or more of the devices coupled to it.

The switch can couple to switches of adjacent fabric routers, according to a set of Gamma graph adjacency rules, by links which fan into and out of the switch. A switch can also forward at least portions of data packets to at least one traffic manager or to switches of the adjacent switching nodes.

Data packets are transported from the devices, which are coupled to the switching nodes by a bus, such as an Infiniband™ bus. The bus is coupled to the traffic manager and is capable of supporting a configurable number of ports. The bandwidth of a port is typically inversely proportional to the number of ports configured per bus. The bus is coupled to at least one application specific module that provides an interface between a device and the switching node transporting data packets from the device to the bus.

Buses, such as Infiniband™ buses, are capable of supporting one or more logical data channels per port and allow application specific modules such as network interface cards, storage subsystems, processor modules WAN and POS interface cards to connect to each switching node. Examples of network interface cards include Ethernet and ATM network interface cards.

Thus, embodiments of networks that include a Gamma graph interconnection network of switching nodes allow for very high port counts and increased bandwidth availability. Furthermore, the use of standard industry buses allows for the interconnection of multiple heterogeneous devices to interface and communicate with one another providing data, data processing, data storage, or other such information and services.

BRIEF DESCRIPTION OF THE DRAWINGS

FIG. 5B is a series of tables illustrating the adjacencies for each node within the Gamma graph of FIG. 5A.

FIG. 13 is a table illustrating a set of control structures managed by a EgressController according to one embodiment.

Figure 1:
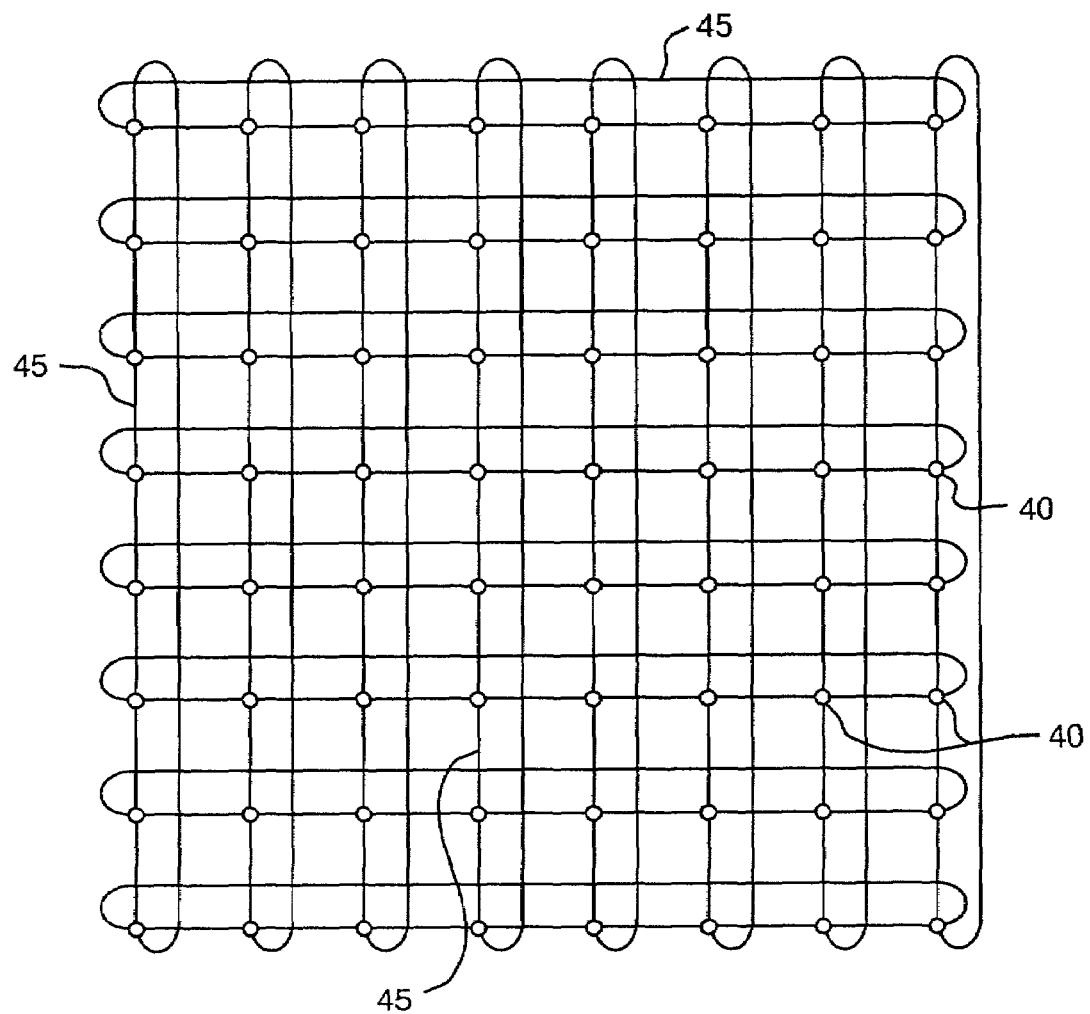
FIG. 1 illustrates a two dimensional torus array fabric used in prior art systems.
Figure 2:
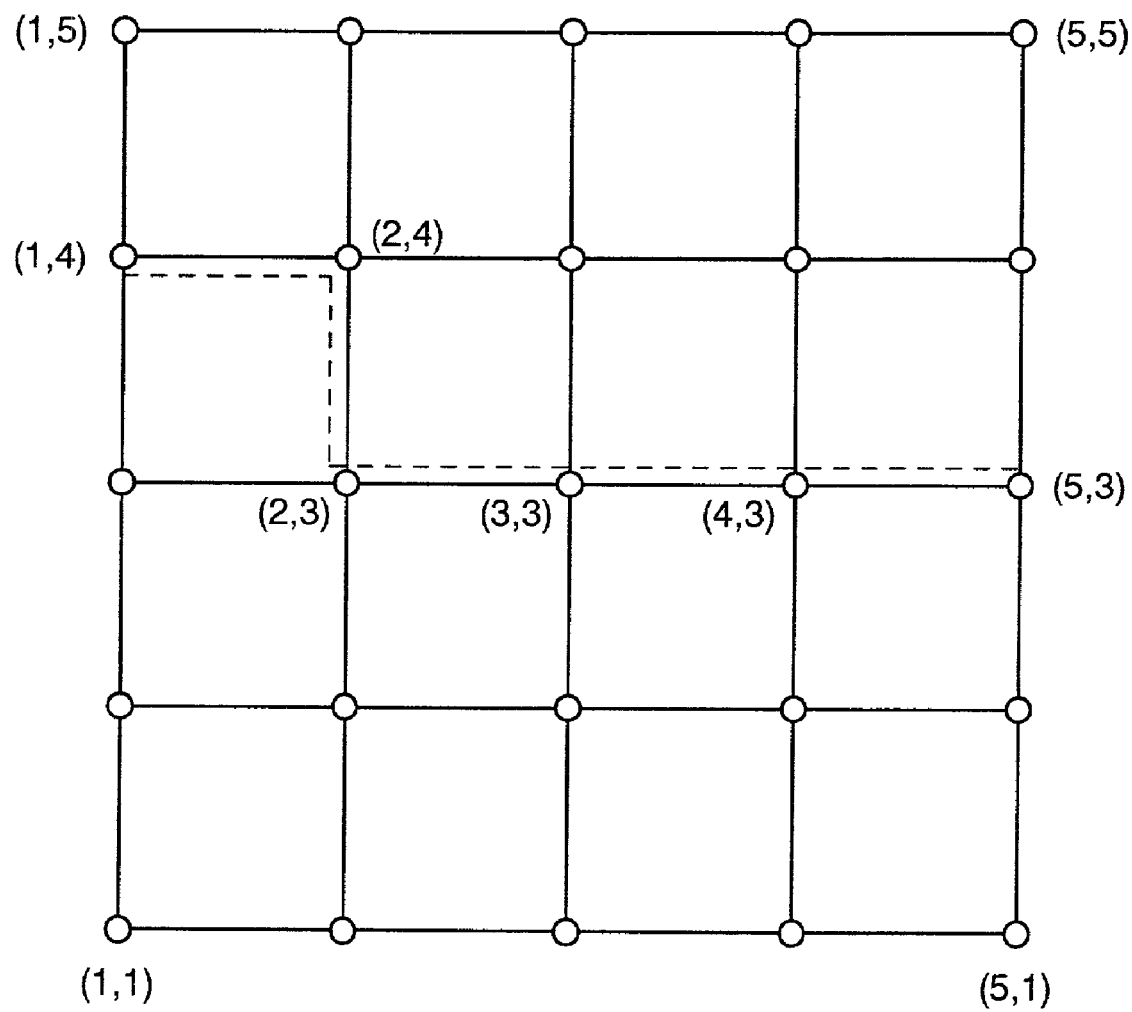
FIG. 2 illustrates packet traversal over path through a fabric.
Figure 3:
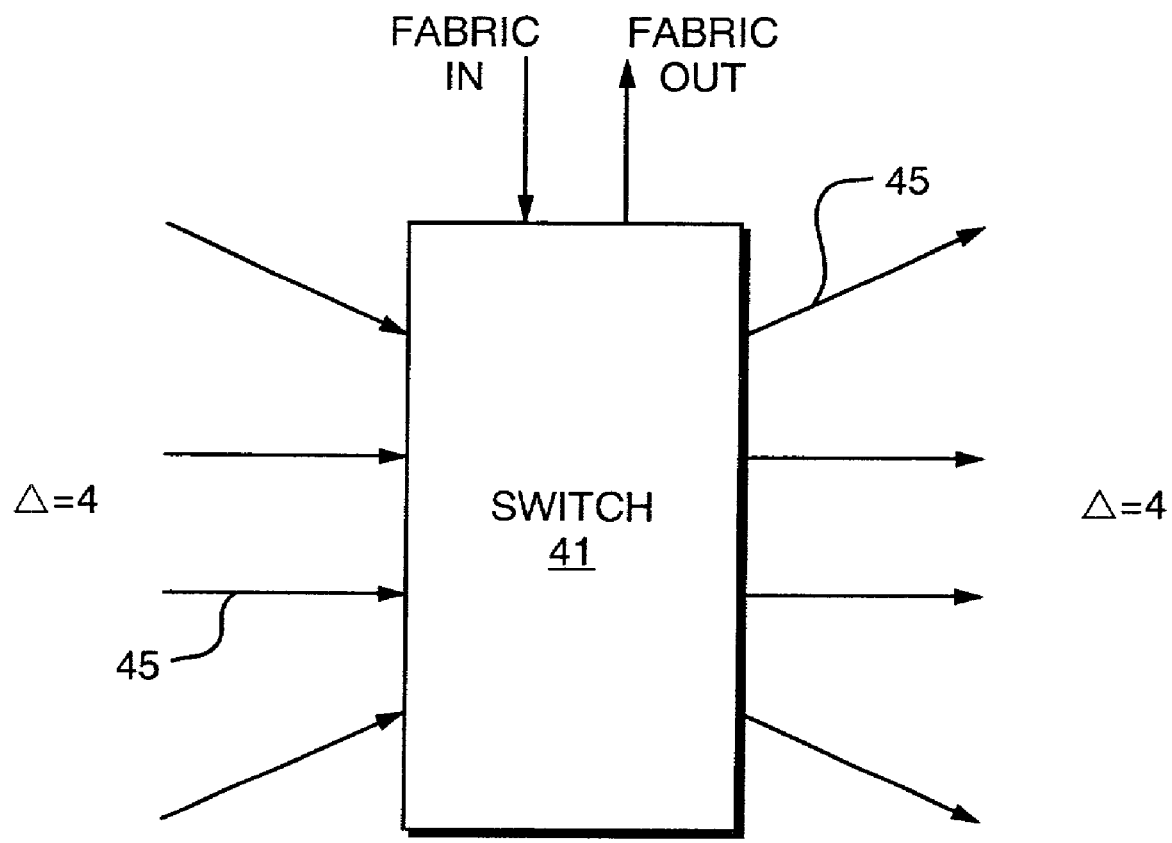
FIG. 3 illustrates a typical switch element of a fabric router for forwarding data packets.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

A network is disclosed for interconnecting devices external to the network. Embodiments of the network include a plurality of switching nodes interconnected by links forming or capable of forming a Gamma graph interconnection network. Devices are coupled to the network via a plurality of ports. Furthermore, the network includes a plurality of Infiniband buses with each switching node coupled to at least one of the buses. Each Infiniband bus is capable of supporting a configurable number of ports such that the bandwidth of a port is inversely proportional to the number of ports configured per bus. The Gamma graph interconnection network of the router providing for high port counts and increased bandwidth availability. Furthermore, the use of industry standard buses, such as Infiniband buses, allow for the interconnection of multiple heterogeneous application specific modules to interface and communicate with one another.

Until now, Gamma graphs have not been exploited as a fabric topology for routers or switches. Moreover, by employing wormhole routing in conjunction with embodiments of the present invention, a stiff backpressure can be implemented regardless of fabric size. The utilization of Gamma graphs and the disclosures presented herein allow the implementation of extremely large scalable fabrics having a crossbar's desirable properties without its impossible scaling problems. However, it should be apparent that embodiments of the present invention may be applied to any type of interconnection network.

In 1988, Faber and Moore disclosed a family of directed graphs, including vertex symmetric directed graphs, for use as a multiprocessor interconnection network ("High Degree Low-diameter Interconnection Networks with Vertex Symmetry: the Directed Case," V. Faber and James W. Moore, Computing and Communications Division, Los Alamos National Laboratory, Los Alamos, N. Mex., the entire teachings of which are incorporated herein by reference). Gamma graphs are maximal for any value of $\Delta$ (switch radix) greater than D (diameter of fabric), interconnecting the largest number of nodes of any known directed graph.

A Gamma graph comprises nodes that are interconnected according to a set of adjacency rules. The nodes within a Gamma graph are labeled with all permutations of words of length D characters where D is the fabric diameter, (e.g. $X_1 X_2 X_3 \ldots X_D$). Characters in each label are members of a $\Delta+1$ element alphabet, (e.g., a, b, c, d, c, and f for $\Delta=5$). Hence the total number of nodes in a complete Gamma graph is calculated by the following equation:

$$(\Delta+1)\Delta(\Delta-1) \ldots (\Delta+2-D) \qquad (1)$$

The following illustrates a set of adjacency rules for a node, $X_1 X_2 X_3 \ldots X_{D-1} X_D$, within a Gamma graph:

$$X_1 X_2 X_3 \ldots X_{D-1} X_D \rightarrow \begin{array}{c} X_2 X_3 X_4 \ldots X_D U_1 \\ X_2 X_3 X_4 \ldots X_D U_2 \\ \vdots \\ \overline{X_2 X_3 X_4 \ldots X_D U_{\Delta+1-D}} \\ \overline{X_2 X_3 X_4 \ldots X_D X_1} \\ X_1 X_3 X_4 \ldots X_D X_2 \\ X_1 X_2 X_4 \ldots X_D X_3 \\ X_1 X_2 X_3 \ldots X_D X_4 \\ \vdots \\ X_1 X_2 X_3 \ldots X_D X_{D-1} \end{array}$$

where $U_j \neq X_1, X_2, X_3, \ldots X_D$ and $U_j \neq U_K$ when $J \neq K$.

One property of the links interconnecting nodes of a Gamma graph is that one of the links is bidirectional (e.g., $X_1 X_2 \ldots X_{D-1} X_D \rightarrow X_1 X_2 \ldots X_D X_{D-1}$), while the other $\Delta-1$ links are unidirectional. Another property of Gamma graphs is that there are $\Delta-1$ disjoint D+1 hop paths from any source to any destination node. Two paths are disjoint if they share no links. This property is used to both create massive fault tolerance and guarantee that strictly non-blocking routing is possible without prior connection knowledge.

Figure 4A:
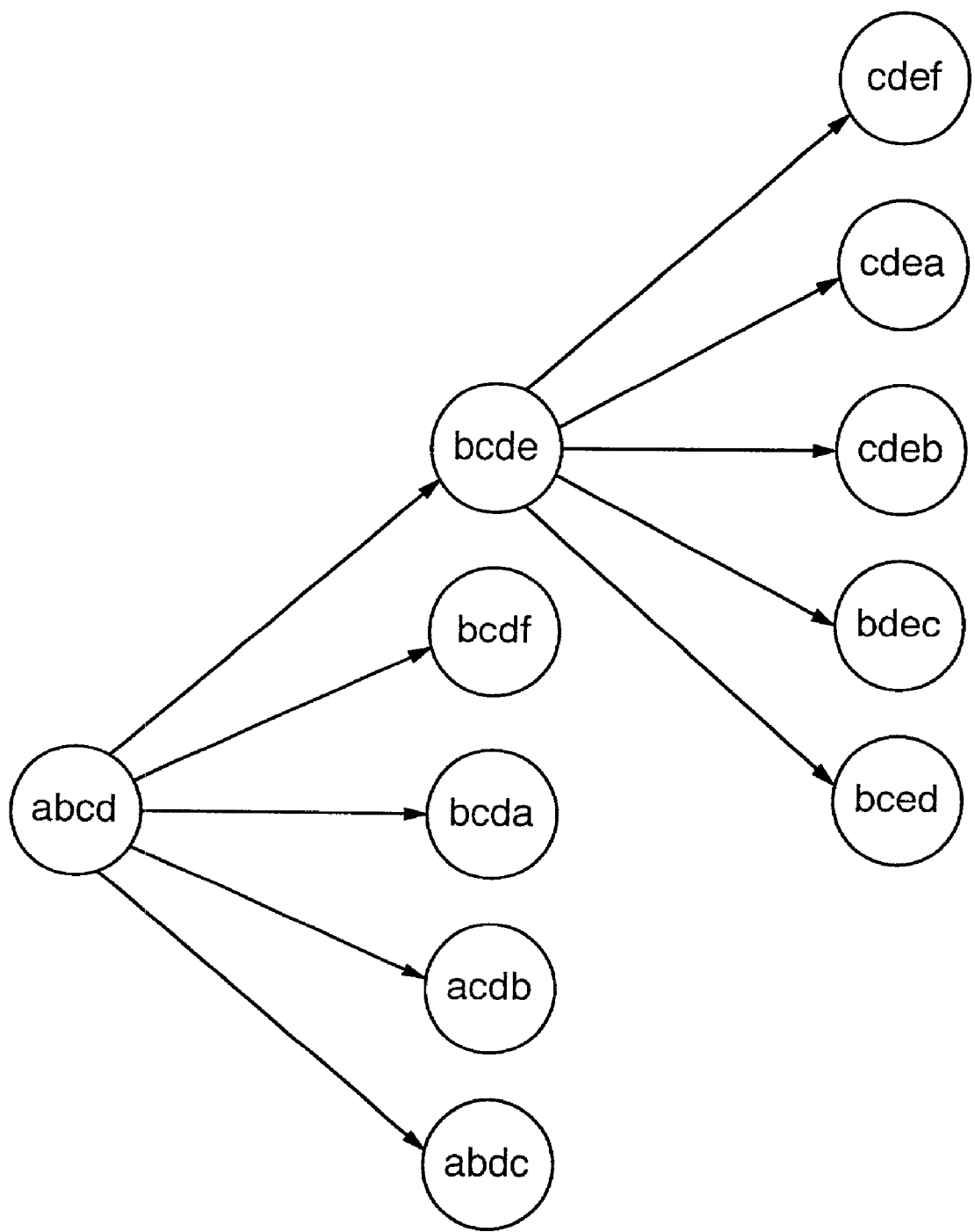
FIG. 4A is an example applying the Gamma graph adjacency rules.

FIG. 4A is an example applying the Gamma graph adjacency rules. Assuming a switch radix ($\Delta$) of 5 and a diameter (D) of 4, the total number of nodes that can be interconnected in a Gamma graph, according to equation (1), is 360. The nodes are labeled with all permutations of words having a length of 4, and the characters in each label are members of a $\Delta+1$ element alphabet, (e.g., a, b, c, d, e, and f for $\Delta=5$). This results in 360 labeled nodes, such as abcd and bcde. As illustrated in FIG. 4A, the adjacent nodes that fan out from a particular node is determined by applying the set of adjacency rules set out above.

Figure 4B:
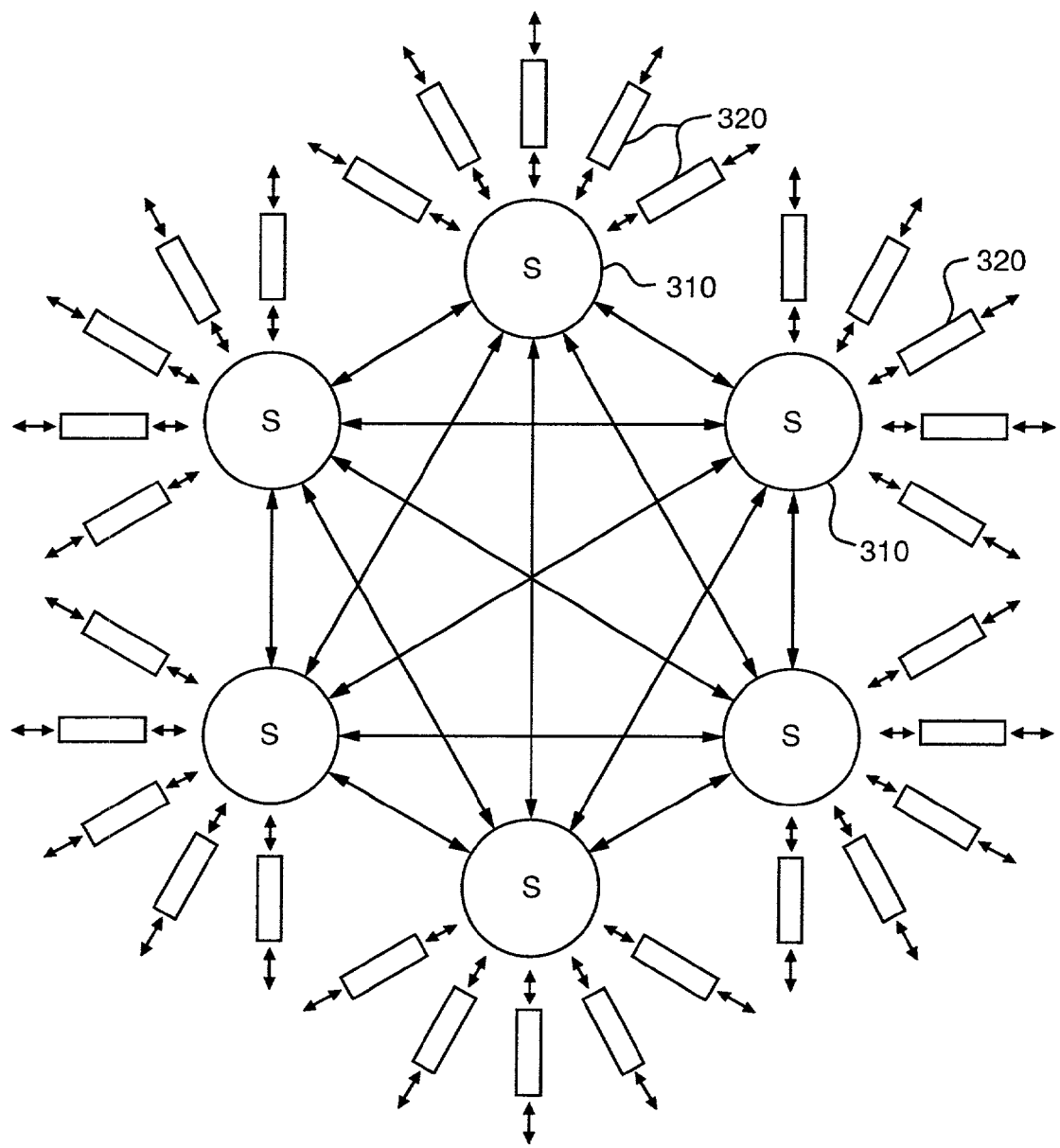
FIG. 4B illustrates a Gamma graph fabric requiring one hop to traverse the fabric according to one embodiment.

FIG. 4B illustrates a Gamma graph fabric requiring one hop to traverse the fabric according to one embodiment. In this configuration, five of the switch ports of each of the switches 310 are configured as access links and five are configured as fabric links. Each access link interconnects a switch 310 to a Traffic Manager 320, which is a component managing the injection and extraction of packets from the fabric. Traffic Manager modules 320 can be added to a motherboard (on which the six switch elements reside) two at a time to increase the switching capacity from 24/6/2×1/4/12 ports to 360/120/30×1/4/12 ports. Note that the above configuration allows ASMs to be dual homed to achieve fault tolerance without resort to fabric replication.

Figure 5A:
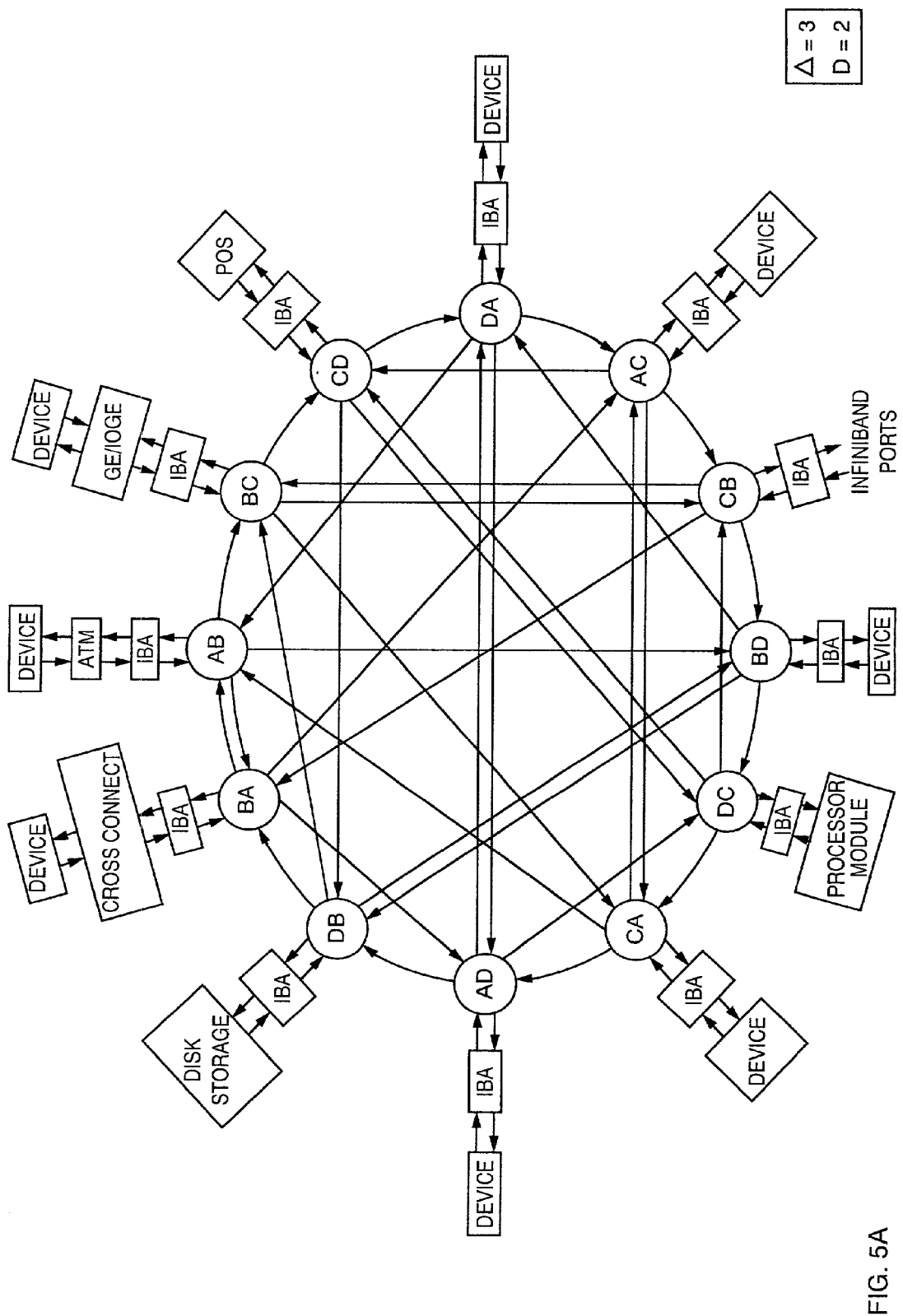
FIG. 5A illustrates a network employing a Gamma graph fabric interconnecting heterogeneous devices according to one embodiment.

FIG. 5A illustrates a network employing a Gamma graph fabric interconnecting heterogeneous devices according to one embodiment. For ease of illustration, the fabric has a switch radix ($\Delta$) of 3 and a diameter (D) of 2 having 12 interconnected fabric routers, such as node AB. Devices are coupled to the network through an Application Specific Module (ASM). Examples of ASMs include Infiniband (IBA), Gigabit Ethernet (GE/10GE), CrossConnect, ATM, POS, disk storage subsystems, and processor modules. According to one embodiment, the fabric presents a plurality of industry standard Infiniband™ buses to the fabric exterior for coupling to each ASM. Infiniband™ facilitates the interoperability of diverse ASMs that are connected to the fabric creating complex systems. The design and construction of ASMs are known to a person skilled in the art. The Infiniband™ architecture is described in more detail in Infiniband™ Architecture Specification Volume 1 & 2, Release 1.0 COPYRIGHT ©1999, the entire contents of which are incorporated herein by reference.

FIG. 5B is a series of tables illustrating the adjacencies for each node within the Gamma graph of FIG. 5A. Since the fabric diameter is two, any destination node can be reached by any source node within two hops. The tables further illustrate some unique properties of Gamma graphs, particularly that there are $\Delta-1$ disjoint D+1 hop paths from any source to any destination node. Since the switch radix ($\Delta$) is equal to 3 and the diameter is 2 hops, there are two disjoint paths involving three hops from any source to any destination node. Referring to FIG. 5B, a packet originating from node AB can reach node CD in two hops via nodes BC and CD. However, it can also reach node CD in three hops via nodes BD, DC, and CD or nodes BA, AC, and CD. This property provides fault tolerance and guarantees strictly non-blocking routing without prior connection knowledge and without fabric replication. For example, if BC is oversubscribed processing packets, node AB can deliver a packet to node CD by selecting one of two alternative paths involving an additional hop.

In addition to providing a standard bus interface for Application Specification Modules, Infiniband™ can be used to achieve flexibility in port configurations. For instance, an Infiniband™ bus can be configured in one of four operating modes corresponding to different combinations of port count and port bandwidth. In its highest bandwidth port size, a single X12 port can be implemented (i.e., twelve 2 Gb/s segments transferring data in parallel in both directions). The three other configurations support two X6, three X4 and twelve X1 ports. The combination of maximal fabric sizes and the standard multi-port bus configurations facilitates the design of a very scalable and high bandwidth multi-application switch router. For example, according to equation (1), a Δ=8, D=4 Gamma graph fabric can have 3024 interconnected fabric routers. Assuming that two Infiniband™ buses are coupled to each fabric router and each Infiniband™ bus is configured to support twelve X1 ports, 72, 576 fabric egress ports are served by a fabric needing only four hops to traverse the fabric.

Furthermore, Infiniband™ allows a port to channel data in logical flow controlled data channels called lanes. For example, if each port supports two lanes each, one lane can be configured to transfer audio and video, while the second lane transfers text. Thus, 145, 152 egress port lanes (i.e., 72, 576 ports×2 egress port lanes) can serve as destinations for packets traversing the fabric.

While multi-hop interconnection networks are scalable, they lack two desirable features of crossbar-based routers: tree saturation free operation and stiff backpressure. With tree saturation free operation, the traffic to a congested output does not interfere with traffic addressed to other outputs. Stiff backpressure refers to flow control signaling of a source node to start or stop sending data.

The lack of non-blocking operation and stiff backpressure is not a problem for multicomputer systems, because multicomputer traffic is self-throttling. After a processor has sent a small number of messages or memory requests (typically 1 to 8), it cannot send any further messages until it receives one or more replies. Thus, when the network slows down because of blocking or congestion, the traffic offered to the network is automatically reduced as the processors stall, awaiting replies.

A switch router, on the other hand, is not self-throttling. If some fabric links in the network become blocked or congested, the offered traffic is not reduced. In general, fabrics are designed with sufficient link capacity to offer low delay transit of packets through the fabric to random destinations. With normal traffic, packets thus transit the fabric with little congestion. Accordingly, a packet is injected into the fabric assuming that a packet will be forwarded across the fabric at the maximum injection rate. This is known as speculative packet injection, because the injection of a packet is started without prior knowledge of the congestion state of links along the path or knowledge of the buffer availability state at the destination into which the packet is to be stored. Because of this, a switch router implemented with an unmodified multicomputer interconnection network is likely to become tree-saturated, and deny service to many nodes not involved in the original blockage.

Tree saturation, particularly link-based tree saturation and egress port-based tree saturation, is a traffic condition negatively affecting the aggregate throughput rate of a fabric. Link-based tree saturation occurs when congestion at a link causes reduced throughput for traffic not passing across the congested link. Egress port-based tree saturation occurs when one oversubscribed egress port on a destination node causes reduced throughput for traffic bound to other egress ports on the same or other destination nodes. In fabrics not employing techniques to avoid link/destination based tree saturation, traffic still flows within the fabric but at a greatly reduced rate.

Similarly, deadlock is a traffic condition where dependency loops form within the fabric. The throughput rate of traffic subject to a dependency loop is zero. When a deadlock condition occurs, it often expands to include all links within the fabric, thus, reducing the aggregate throughput rate of the fabric to zero.

Figure 6:
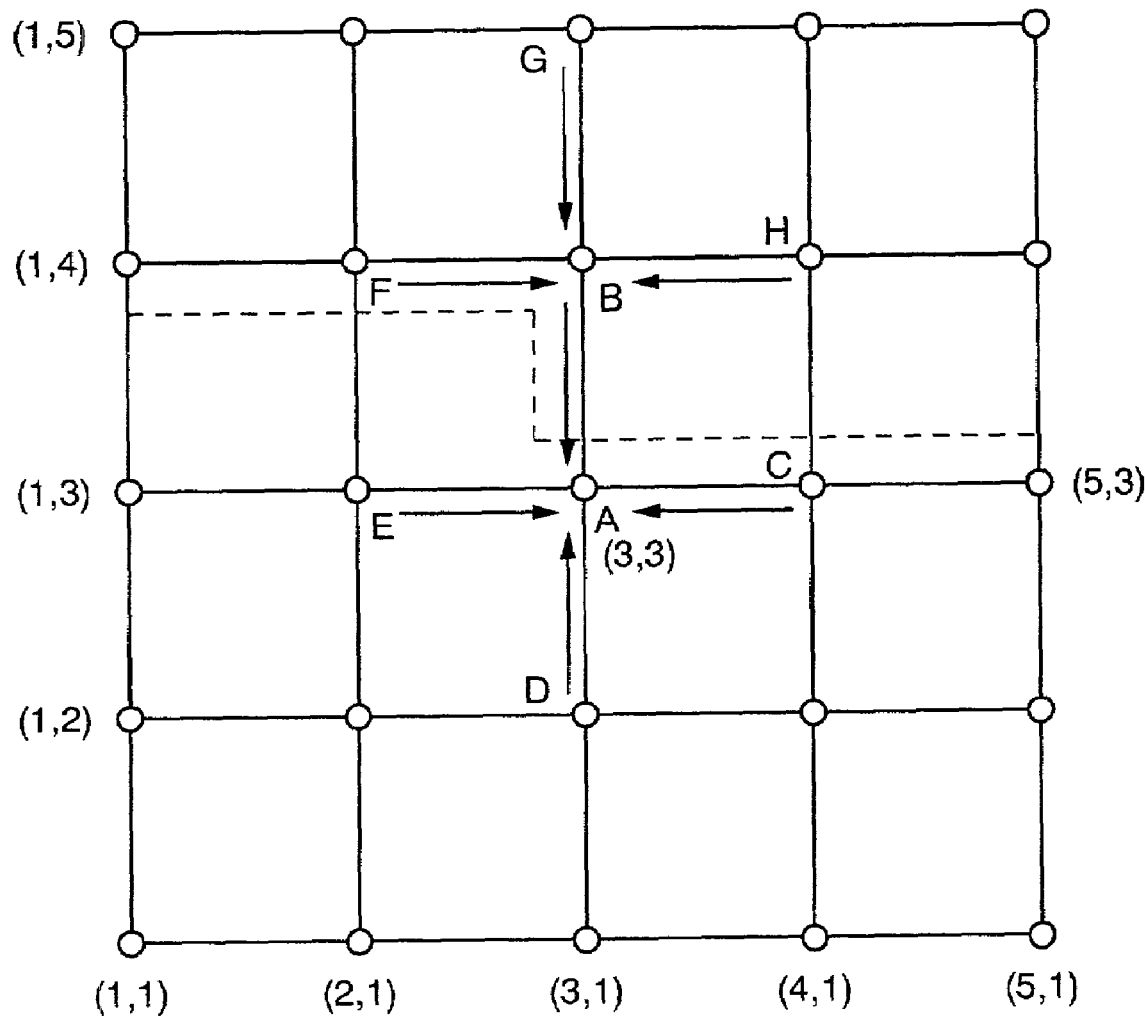
FIG. 6 illustrates tree saturation of a network.

Consider the situation of link based tree saturation illustrated in FIG. 6. A single node in a 2-dimensional mesh network, node (3,3) labeled A, is overloaded with arriving messages. As it is unable to accept messages off the channels at the rate they are arriving, all four input fabric links to the node, (B,A), (C,A), (D,A), and (E,A), become congested and are blocked. Traffic arriving at nodes B through E that must be forwarded across these blocked links cannot make progress and will back up along the edges into nodes B through E. For example, traffic into node B backs up along (F,B), (G,B), and (H,B). If the blockage persists, the links into F through H and related nodes become blocked as well and so on. If the overload on node A persists, eventually most of the links in the network will become blocked as a tree of saturation expands outward from node A. The major problem with tree saturation is that it affects traffic that is not destined for node A. For example, a packet from (1,4) to (5,3) may be routed along a path (dotted line) that includes (F,B) and (B,A). Since these links are blocked, traffic from node (1,4) to node (5,3) is blocked even though neither of these nodes is overloaded.

Previously, tree saturation and deadlock in fabrics implementing IP switch routers were addressed using destination based virtual networks (DBVNs), which are described in more detail in PCT Patent Application Serial No. PCT/US98/16762, entitled "Router with Virtual Channel Allocation," filed Aug. 20, 1998, and published as WO99/11033, as well as U.S. patent application Ser. No. 08/918,556, entitled "Internet Switch Router," filed Aug. 22, 1997. Both PCT Patent Application Serial No. PCT/US98/16762 and U.S. patent application Ser. No. 08/918,556 are incorporated by reference in their entirety. A destination based virtual network set includes a virtual network implemented for each priority (e.g., high or low priority) per destination node in the fabric.

Figure 7:
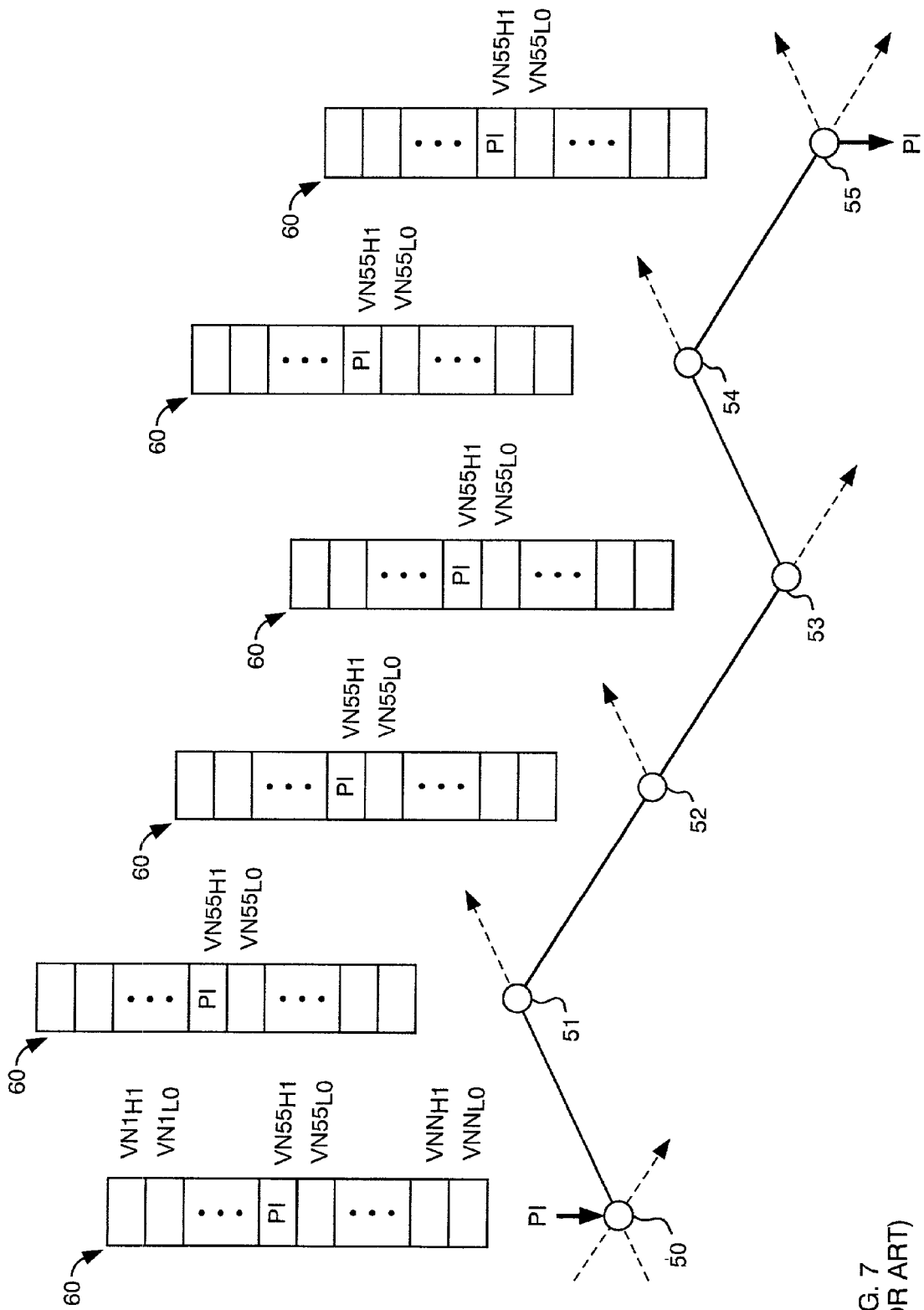
FIG. 7 illustrates packet traversal through a fabric implementing destination based virtual networks.

FIG. 7 illustrates packet traversal through a fabric implementing destination based virtual networks. Destination based virtual networks are implemented with a fixed number of dedicated buffer resources 60 at each fabric router, such as nodes 50 through 55. A virtual network is implemented for per destination node per priority. Control structures, such as packet queues, (not shown) are used to manage the flow of packets through each virtual network (i.e., $VN1_{HI}$, $VN1_{LO}$, ... $VNN_{HI}$, $VNN_{LO}$).

Packets are forwarded across the fabric, for example, on a high or low priority virtual network associated with a particular destination node. At each hop along a path through the fabric, a packet is temporarily stored in buffers dedicated to the virtual network being traversed. Referring to FIG. 7, a packet P1 of high priority traverses the fabric to destination node 55 over a path of fabric routers on virtual network, $VN55_{HI}$. At each hop along the path, the packet is temporarily stored in dedicated buffers corresponding to virtual network, $VN55_{HI}$.

Since buffer resources are dedicated to each destination based virtual network, deadlock is impossible and packets experience congestion only when the virtual network on which they are traversing is congested. Thus, packets bound for uncongested destination nodes are allowed to flow past packets bound for congested nodes.

However, destination based virtual networks are difficult to scale for very large fabric sizes containing multiple ports and priorities, because a virtual network must be implemented and managed for every packet destination exiting the fabric. In particular, dedicated buffer resources and control structures are required for every virtual network. To support per egress port priority flow control, dedicated buffer resources and control structures are required per destination node per egress port per priority. Therefore, as fabric size, port count, and priorities increases, the number of buffer resources and control structures increase exponentially.

Therefore, implementing a destination based virtual network for a Gamma graph fabric having 3024 fabric routers, 24 fabric egress ports per fabric router, and 2 Infiniband lanes per fabric egress port would require dedicated buffer resources and control structures to manage 145, 152 virtual networks. Particularly, each fabric router would require control structures to manage all 145, 152 destination based virtual networks per radix port. For example, fabrics having a switch radix equal to 8 and implementing a packet queue with a 13-bit pointer for each virtual network, over 15 million bits of on-chip memory would be required (i.e., 145, 152 virtual networks×13-bits per queue pointer×8 outbound ports is approximately 15 million bits). Since current ASIC technology only allows about 500–1000 virtual networks to be implemented, the existing tree saturation avoidance scheme cannot scale to such large fabrics.

Embodiments of the present invention allow for increased fabric bandwidth and scalability, while also preventing deadlock and tree saturation regardless of fabric size. An embodiment of the present invention is disclosed as it is applied to a Gamma graph fabric implemented in a router. Embodiments of the present invention implement virtual networks requiring a reduced number of control structures at each fabric router and dynamically assign buffer resources to individual virtual networks. According to one embodiment, the set of destination based virtual networks (DBVN) is partitioned into two virtual network sets, source based virtual networks (SBVNs) and egress based virtual networks (EBVNs). A packet is communicated through the fabric by traversing a source based virtual network and then traversing an egress based virtual network.

The source based virtual network corresponds with the source of the packet, while the egress based virtual network corresponds to the destination of the packet. According to one embodiment, the packet source may be a fabric ingress port, while a packet destination may be a fabric egress port. Since a port may support multiple data channels, a packet source may be an individual data channel (e.g., an Infiniband™ fabric ingress port lane) or a group of incoming data channels of a fabric ingress port. Similarly, a packet destination may be an individual data channel (e.g., an Infiniband™ fabric egress port lane) or a group of outgoing data channels of a fabric egress port. Furthermore, a port, or channels thereof, may be associated with a priority (e.g., high or low priority). Therefore, a packet source may also correspond to the priority of a fabric ingress port, an individual channel, or a group of channels thereof. Similarly, a packet destination may correspond to the priority of a fabric egress port, an individual channel, or a group of channels thereof.

Both source based and egress based virtual networks are composed of "tunnels" through which packets are forwarded. According to one embodiment, a tunnel is a logical path through the fabric implemented with buffer resources dynamically assigned at each fabric hop. As a packet traverses each hop along a tunnel, packet buffers are dynamically assigned in the next hop fabric router to the tunnel allowing temporary packet buffering.

Since tunnels are logical paths, multiple tunnels can share the same physical path. Similarly, tunnels whose paths intersect may share one or more physical path segments. Therefore, tunnels prevent tree saturation and deadlock from occurring, because packets traversing different tunnels can bypass one another.

Figure 8A:
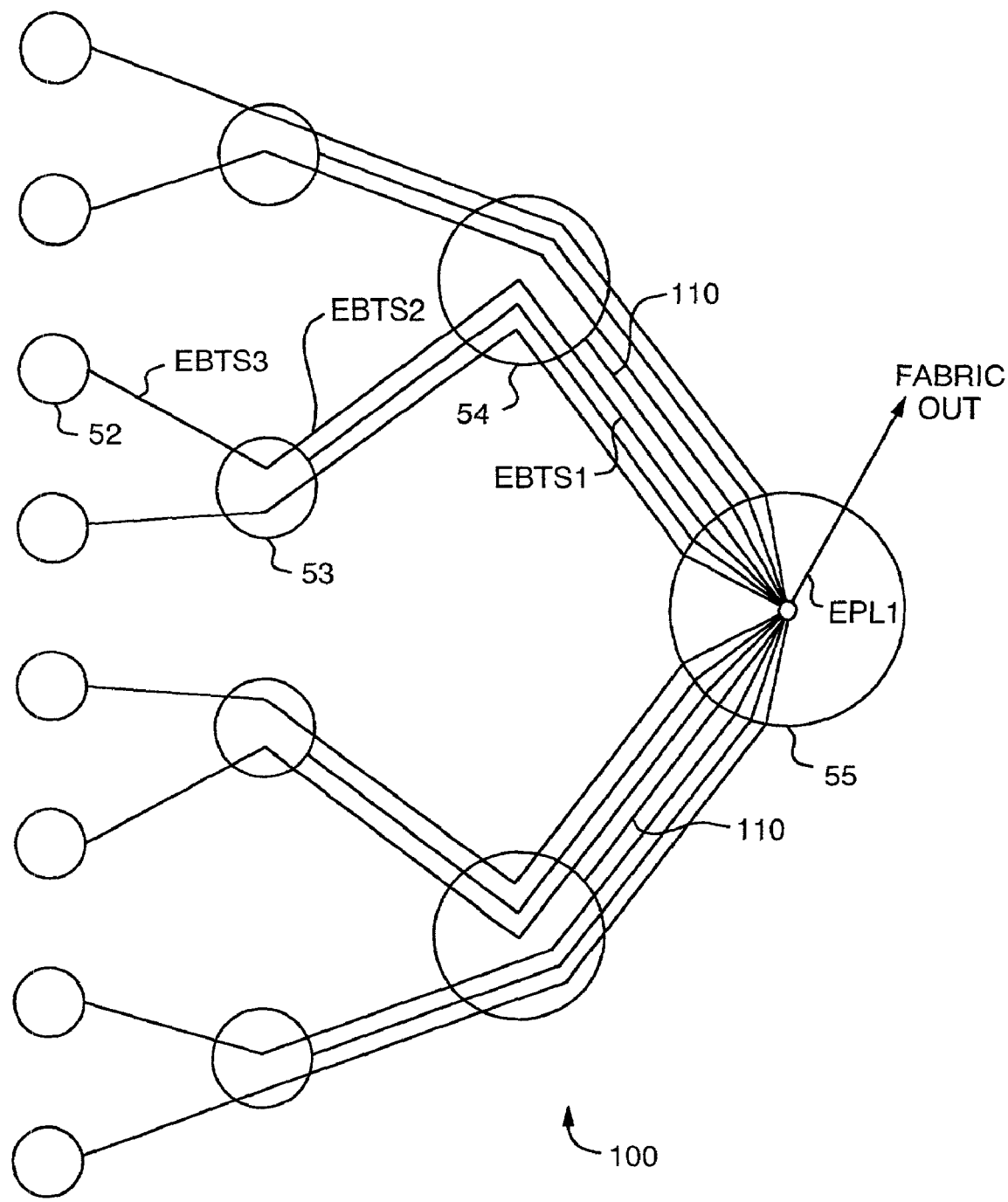
FIG. 8A illustrates a egress based virtual network according to one embodiment.

FIG. 8A illustrates an egress based virtual network comprising multiple tunnels according to one embodiment. The egress based virtual network (EBVN) 100 is a logical network implemented by a number of individual tunnels 110, referred to as egress based tunnels (EBTs). Each of the egress based tunnels is a logical path through the fabric to a common packet destination, such as fabric egress port lane EPL1. Each continuous line between two or more nodes represents an egress based tunnel, such as the continuous line extending through nodes 52, 53, 54, and 55. FIG. 8A illustrates an egress based virtual network for a single egress port lane. However, if each node has multiple egress port lanes, an egress based virtual network with a set of egress based tunnels is associated with each one. Thus, every packet destination has an egress based virtual network for funneling packets out of the fabric.

Egress based tunnels do not extend the entire diameter of the fabric. Therefore, source based virtual networks are implemented to provide logical paths into the fabric for injecting packets from a packet source into egress based virtual networks originating a number of hops within the fabric.

Figure 8B:
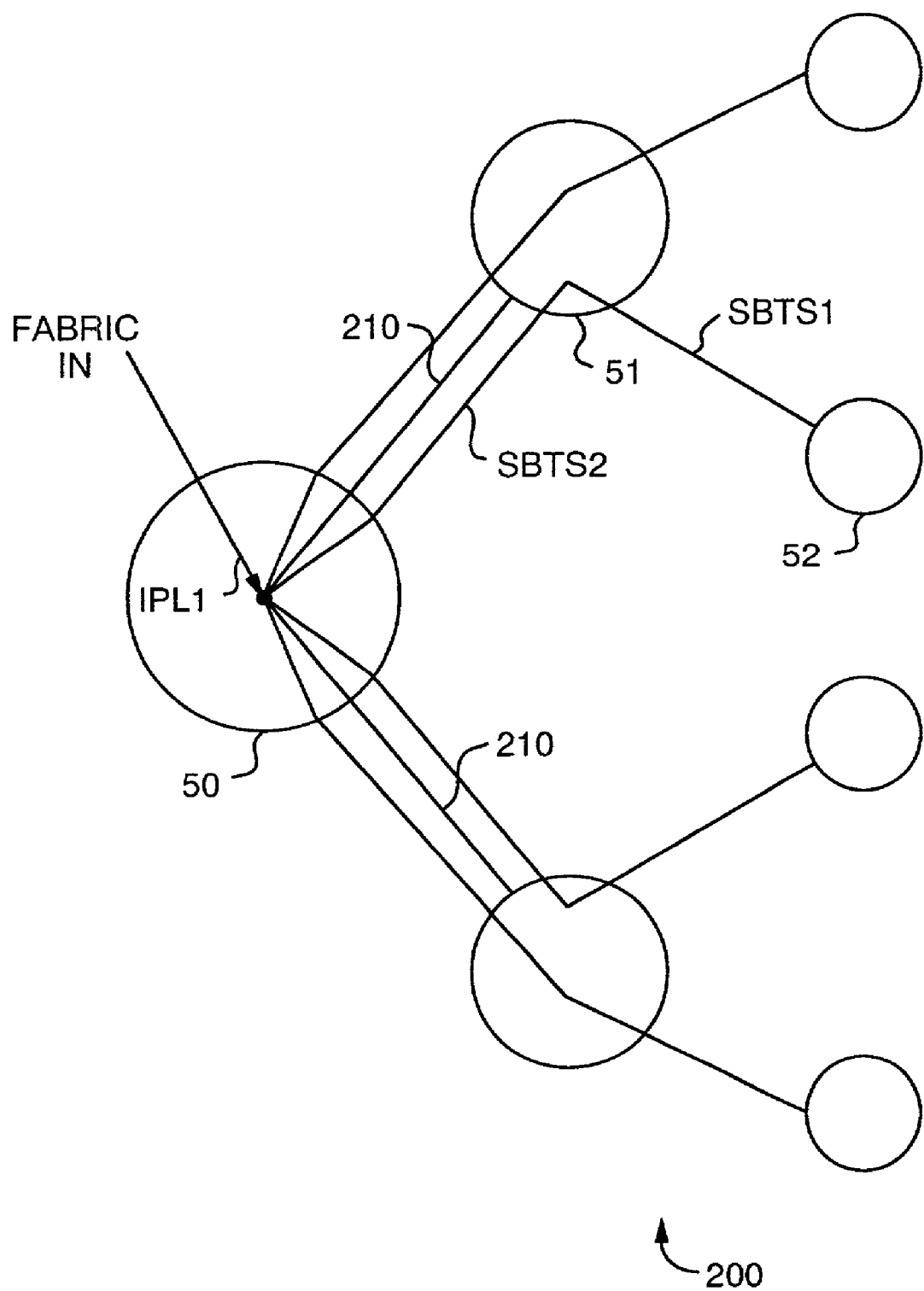
FIG. 8B illustrates a source based virtual network according to one embodiment.

FIG. 8B illustrates a source based virtual network according to one embodiment. The source based virtual network (SBVN) 200 is a logical network implemented by a number of individual tunnels 210, referred to as source based tunnels (SBTs). Each of the source based tunnels is a logical path through the fabric from a common packet source, such as fabric ingress port lane IPL1 to a binding node within the fabric. A binding node allows packets traversing a source based tunnel to transition into one of the egress based tunnels fanning out from it. Each continuous line between two or more nodes represents the logical path of a source based tunnel, such as the continuous line extending through nodes 50, 51, and 52. FIG. 8B illustrates a source based virtual network for a single ingress port lane. However, if each node has multiple ingress port lanes, a source based virtual network with a set of source based tunnels is associated with each one. Thus, every packet source has a source based virtual network for injecting packets into the fabric.

Figure 9:
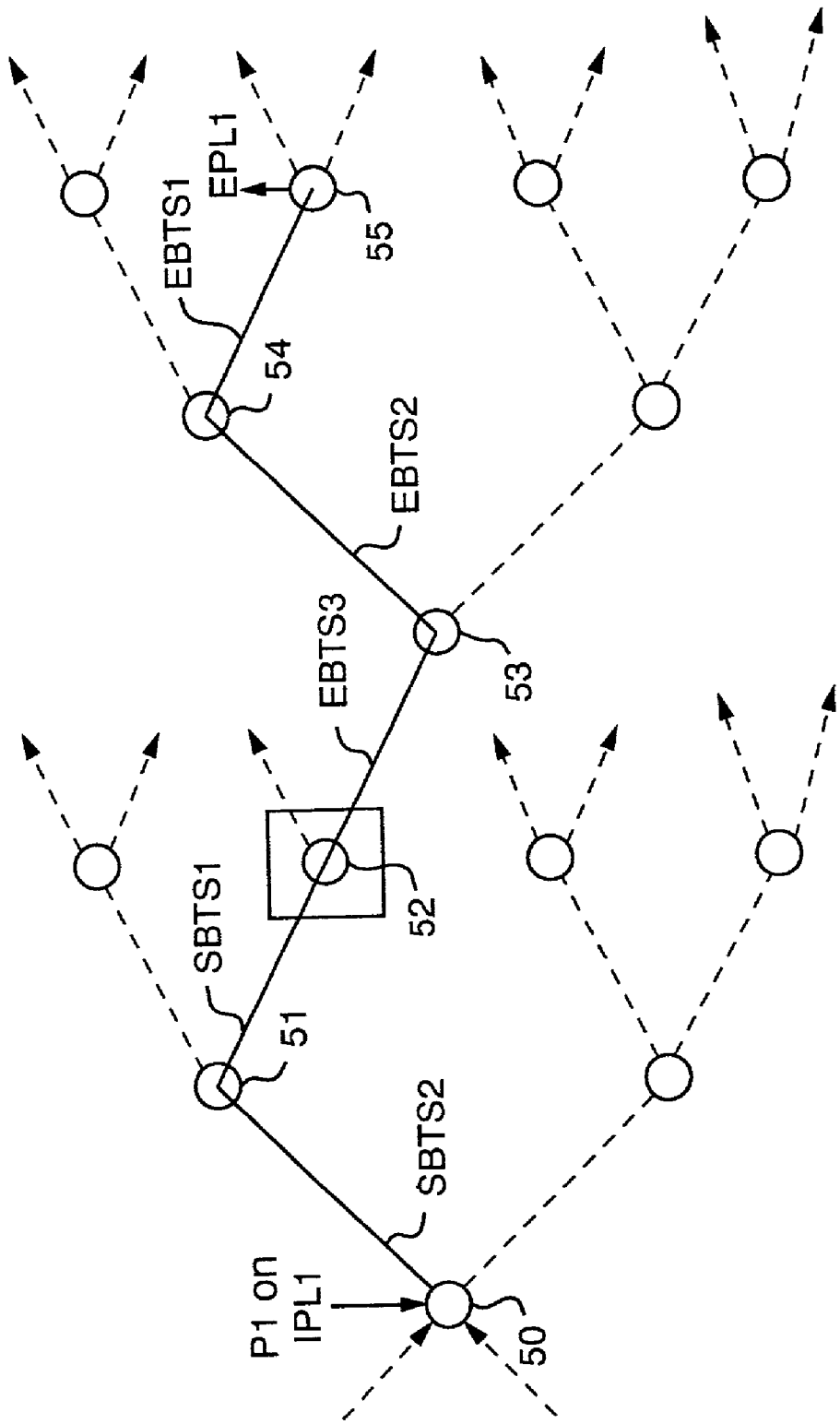
FIG. 9 illustrates packet traversal through the fabric over a source based virtual network and an egress based virtual network according to one embodiment.

FIG. 9 illustrates packet traversal through the fabric over a source based virtual network and an egress based virtual network according to one embodiment. For ease of illustration, FIG. 9 is a portion of a fabric having a switch radix ($\Delta$) of 2 and a diameter (D) of 5. Labeled nodes 50, 51, 52, 53, 54, and 55 of FIG. 9 correspond to nodes 50, 51, 52 of FIG. 8A and nodes 52, 53, 54, and 55 of FIG. 8B.

To communicate a packet from any source to any destination, a packet traverses a source based virtual network and an egress based virtual network. A packet P1 is injected into a source based tunnel associated with the packet source IPL1. Since the egress based virtual network is two hops away from node 50, packet P1 is injected into a source based tunnel allowing it to traverse a logical path over the physical path encompassing nodes 50, 51, and 52. Packet P1 traverses the source based tunnel to its binding node endpoint 52, where the packet transitions into an egress based tunnel associated with packet destination EPL1. In FIG. 9, the egress based tunnel is a logical path over the physical path encompassing node 52, 53, 54, and 55. The packet then traverses the egress based tunnel until it reaches the packet destination exiting the fabric at EPL1.

A tunnel is constructed with a set of tunnel segments, each corresponding to a logical hop implemented over an access link (i.e., an internal link within a fabric router) or a fabric link. According to one embodiment, a tunnel segment is implemented with buffer resources dynamically assigned at a next hop fabric router. Dynamic allocation to tunnel segments provides for more efficient utilization of buffer resources. The dynamically assigned buffers allow the packet to be temporarily stored at the next hop after traversing the access or fabric link. Source based tunnels are constructed with source based tunnel segments (SBT Segments), while egress based tunnels are constructed with egress based tunnel segments (EBT Segments). Referring to FIGS. 9 and 8A, the source based tunnel extending through nodes 50, 51, and 52 is composed of two SBT segments, SBTS2 and SBTS1. Referring to FIGS. 9 and 8B, the egress based tunnel extending through nodes 52, 53, 54, and 55 is composed of three EBT segments, EBTS3, EBTS2, and EBTS1.

Each fabric router, such as nodes 50, 51, 52, 53, 54, and 55, manages sets of SBT Segments and sets of EBT Segments. As a packet traverses each hop of a tunnel, a tunnel segment is selected to extend the tunnel to the next hop. Packets transit tunnel segments one packet at a time. Thus, when a packet transits one tunnel segment not terminating at the fabric egress port, the packet must bid for use on the next tunnel segment in order to extend the tunnel to the next hop. If the targeted next tunnel segment is busy or another packet wins the arbitration, the packet is added to a queue of packets waiting to traverse the selected tunnel segment. A packet queue is implemented for each tunnel segment managed by the fabric router.

Figure 10:
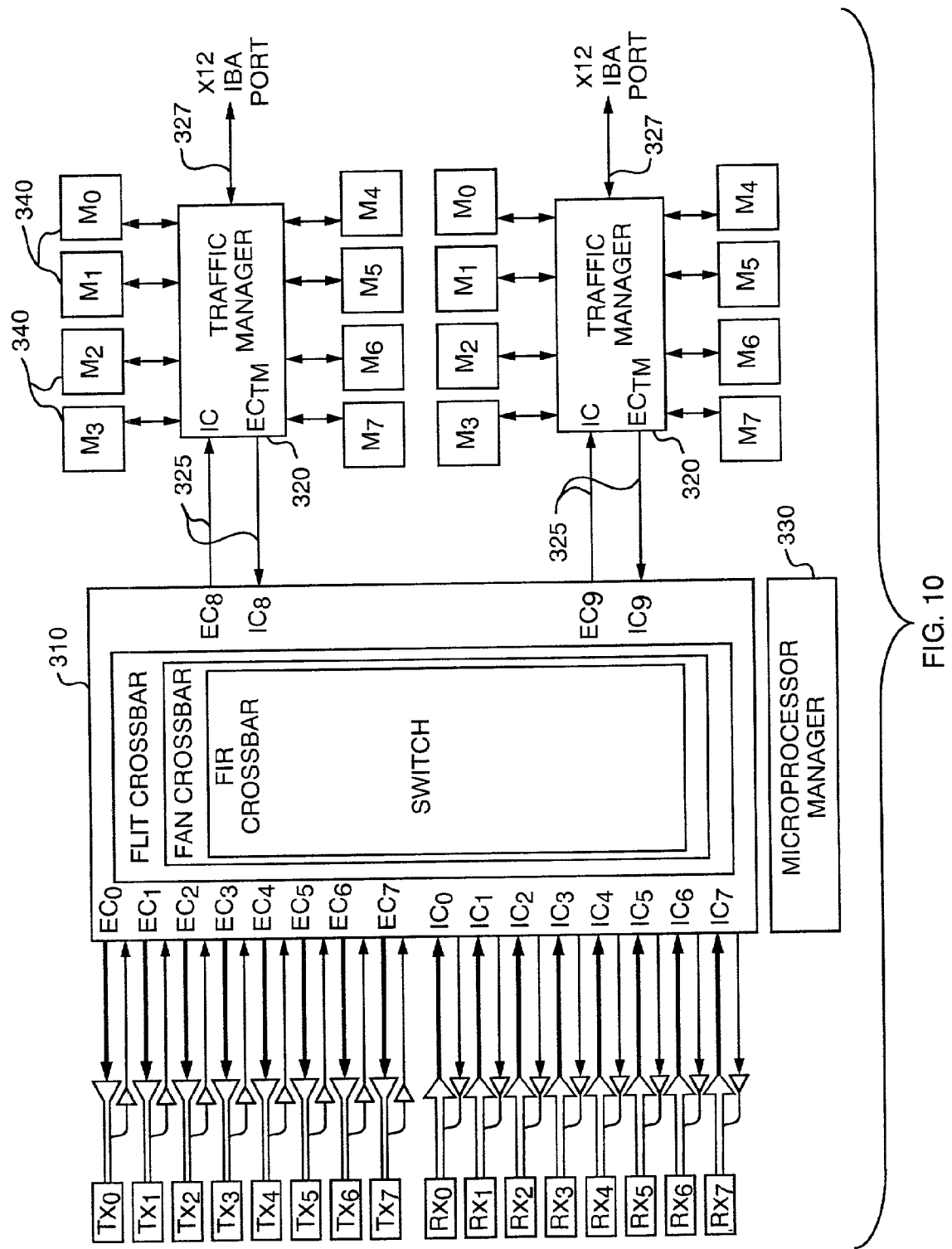
FIG. 10 illustrates the structure of a fabric router according to one embodiment.

FIG. 10A illustrates the structure of a fabric router according to one embodiment. Large fabrics typically cannot be packaged using the standard mother/daughter card arrangement employed in personal computers, rather a different packing scheme is required to allow the use to incrementally grow the fabric. Ideally, the fabric can grow by one switch module at a time. To allow maximum flexibility in scaling larger fabrics, one embodiment of a fabric router packages a switch element 310, one or more Traffic Managers 320, a microprocessor 330, and memory 340. With this node configuration, fabrics utilizing Gamma graphs as the fabric topology can be created supporting up to 76,896/25,732/6408×1/4/12 ports.

Switch implementations can utilize either single or multiple chips. Single chip implementations having port bandwidths in the 20–30 Gb/s per port limit the radix of a switch to 10–14 due to pin limitations. Multi-chip switch implementations can be employed to increase the switch radix but dramatically increase the implementation complexity and increase costs for small fabrics. The bandwidth of each switch port typically is a few times the bandwidth of the largest single ingress flow. To support 10GE and OC192 data streams, the bandwidth requirement of a single switch port is typically in the 25–30 Gb/s range.

According to one embodiment, the switch element 310 includes three 10×10 crossbar switches, ten IngressControllers, ten EgressControllers, and a pool of packet buffers (not shown). An IngressController manages the receipt of packets into the switch, while the EgressController manages the transmission of packets out of the switch. Each of the switch ingress ports is coupled to an IngressController terminating the downstream end of each ingress link. Similarly, each of the switch egress ports is coupled to an EgressController terminating the upstream end of each egress link. The main crossbar transfers packets or packet segments (e.g., flits) read from packet buffers to EgressControllers. The other two crossbars transfer control messages between IngressControllers and EgressControllers.

The switch element forwards packets received on any switch ingress port to a selected switch egress port. The switch is coupled to two Traffic Manager elements 320 via access links 325, which are typically electrical connections. Since two of the switch ingress and egress ports are utilized to connect to the Traffic Managers, the radix of this switch element is equal to $\Delta=8$ allowing eight fabric links to fan in and fan out from the switch interconnecting with other fabric routers. For small fabrics, the fabric links may be electrical connections. To allow maximum flexibility in interconnecting these switch modules, particularly for large fabrics, optical interconnections between fabric nodes may be implemented.

The Traffic Managers manage the injection and extraction of packets to and from the fabric. In addition, a Traffic Manager provides application wide ancillary services such as packet buffering and multicast as well as application specific services such as Random Early Discard and Packet Metering. The Traffic Managers are implemented as separate ASICs in order to maximize the radix ($\Delta$) of the switch. However, the functionality of the Traffic Manager can be embedded into the switch element at the expense of severely limiting the switch radix. External memory chips 340 are utilized by the Traffic Managers for lookup tables, packet and control structure storage and monitoring structure storage.

Each Traffic Manager has a bus interface 327 to the external links of the fabric exterior. According to one embodiment, the bus interface is an Infiniband™ bus interface. This allows for interoperability of industry standard communications, processing and storage modules to interconnect with one another via the fabric. Although there is substantial motivation for providing an external interface which conforms with some industry standard bus, the links interconnecting switches to other switches (i.e. fabric links) and the links interconnecting switches to Traffic Managers (i.e. access links) need not conform with an industry standard. In particular, the links can be optimized to incorporate mechanisms for implementing wormhole routing and avoiding tree saturation as these features are useful only on intra fabric links.

A microprocessor 330 is normally incorporated on each node to implement the fabric management and monitoring functions. For example, the microprocessor may implement source routing and specify physical paths through the fabric between packet sources and packet destinations.

Figure 11A:
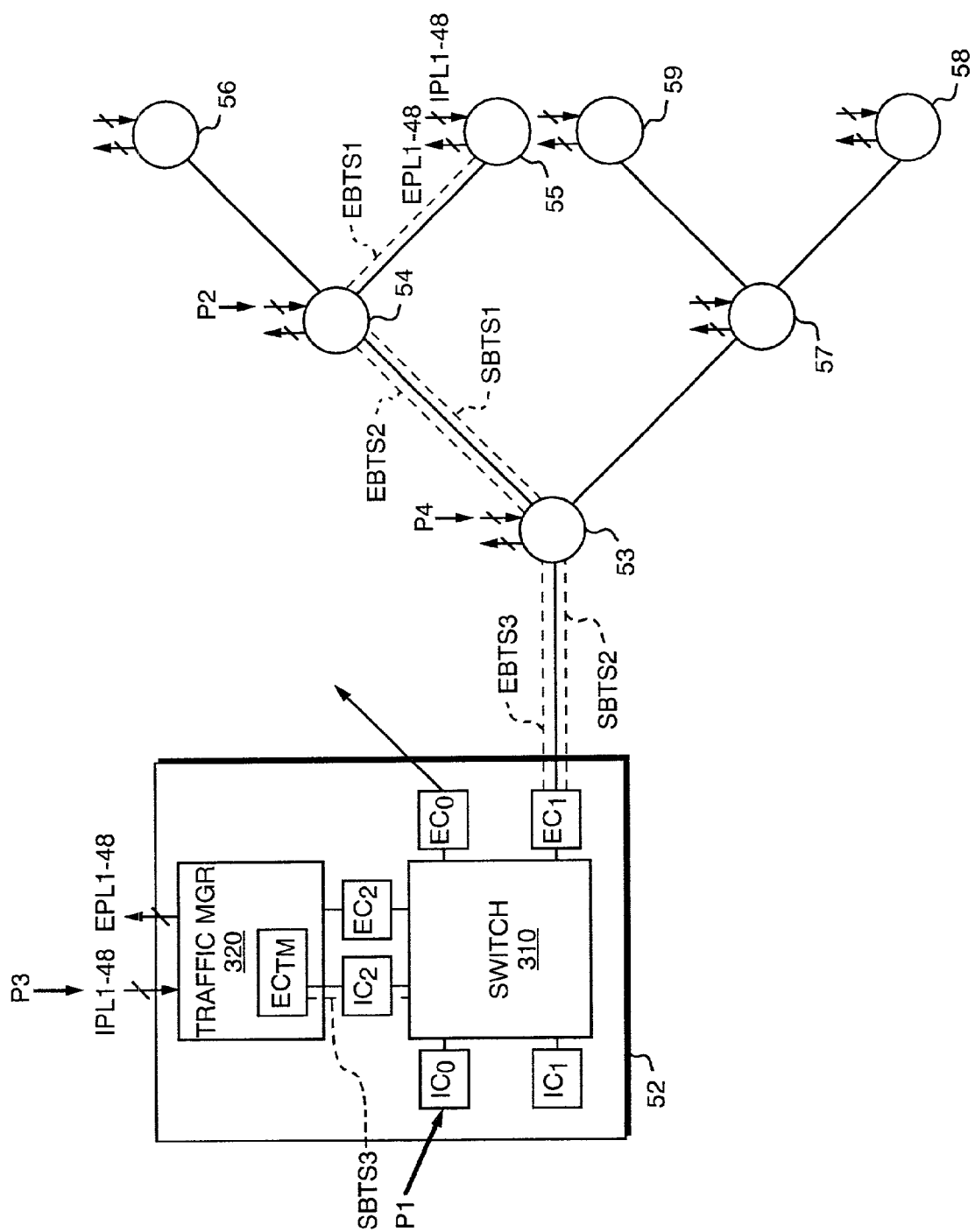
FIG. 11A is a diagram illustrating the management of tunnel segments from a fabric router according to one embodiment.

FIG. 11A is a diagram illustrating the management of tunnel segments from a fabric router according to one embodiment. Tunnel segments are managed by a controlling agent, referred to as an EgressController, which handles the flow of packets through them. Each Traffic Manager includes an EgressController (i.e., $EC_{TM}$) at the head end of each access link interconnecting the Traffic Manager to a switch element, while each switch element includes an EgressController (e.g., $EC_0$ and $EC_1$), at the head end of every fabric link interconnecting the switch to other switch elements in the fabric. An EgressController in a Traffic Manager manages SBT segments. Similarly, most Egress- Controllers in a switch element manage both SBT segments and EBT segments, with the exception of EgressControllers coupled to an access link.

Regarding switch elements, each EgressController manages a set of EBT Segments for all packet destinations, such as fabric egress port lanes, reachable from the EgressController within a number of hops less than the fabric diameter (hops<D). According to one embodiment, the total number of EBT segments managed at any one EgressController equals $N(1+\Delta+ \ldots +\Delta^{D/2})$ as opposed to approximately $N\Delta^D$ virtual channels of a DBVN system.

For example, in a D=4 fabric, an EBT Segment can be required for each egress port lane per destination node reachable from the EgressController in one, two, or three hops. Thus, the number of EBT segments managed in any EgressController is $N(1+\Delta+\Delta^2)$ where N is equal to the number of egress port lanes per node. Referring to FIG. 11A, assuming each fabric router services 48 fabric egress port lanes, EgressController $EC_1$ of node 52 manages an EBT Segment for each egress port lane (EPL1 through EPL48) one hop away at node 53, two hops away at nodes 54 and 57, and three hops away at nodes 55, 56, 58, and 59. Since the number of virtual channels managed in each fabric router in a destination based virtual network system would be approximately equal to $N\Delta^4$, embodiments of this invention result in a significant reduction in the number of control structures required at each EgressController.

Figure 11C:
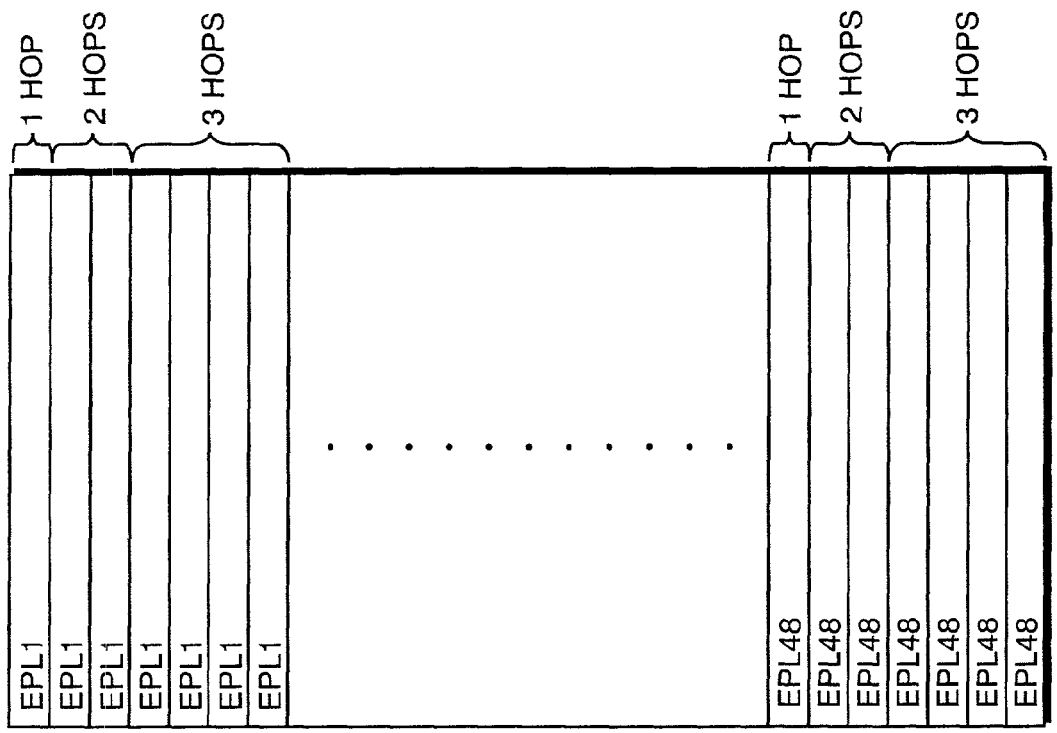
FIG. 11B and FIG. 11C illustrate alternative ways of grouping a set of EBT Segments according to embodiments of the invention.
Figure 11B:
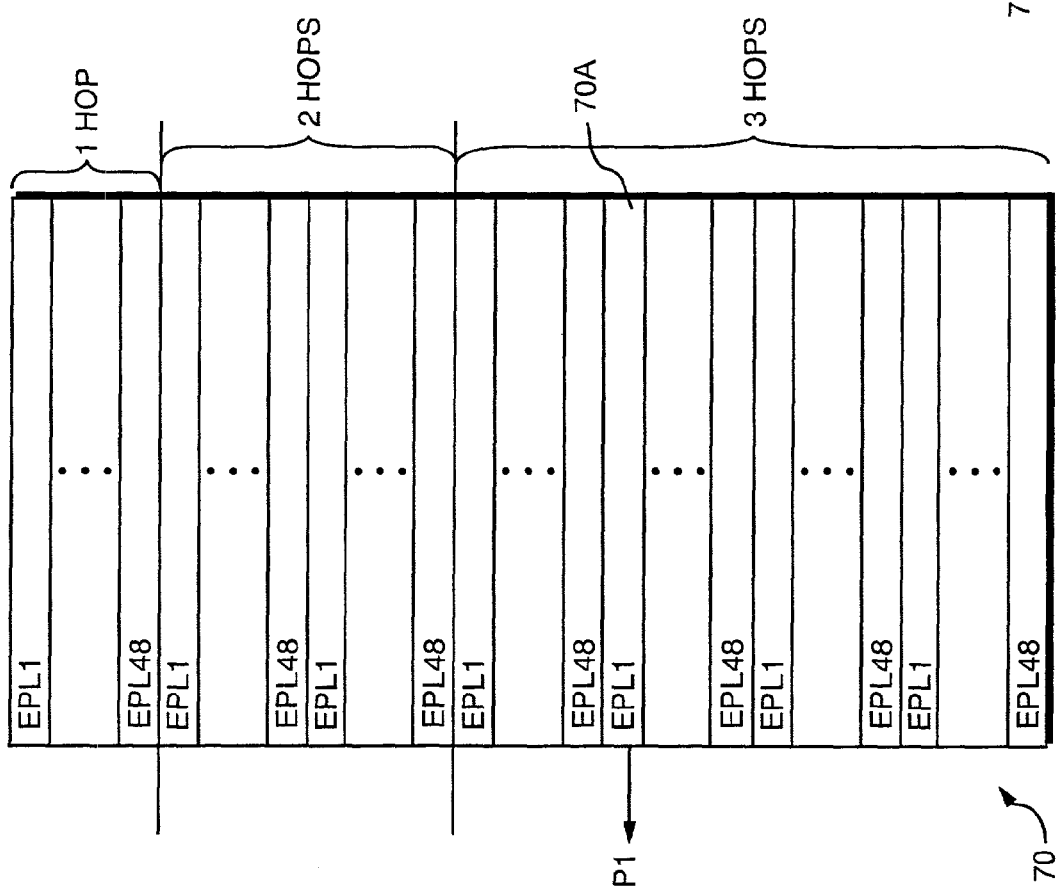

EBT Segments may be managed with control structures, such as packet queues. FIG. 11B and FIG. 11C illustrate alternative ways of grouping a set of EBT Segment queues, 70 and 75, according to embodiments of the invention. For example, a set of EBT Segment queues 70 managed by a switch EgressController can be partitioned into groups having differing egress port lane identifiers, but sharing the same path to a common destination node as illustrated in FIG. 11B. Alternatively, the ensemble of EBT Segment queues 75 can be partitioned into groups having the same egress port lane identifier on different destination nodes as in FIG. 11C.

As a packet traverses each hop of an egress based tunnel, an EBT Segment is selected to extend the tunnel to the next hop. In particular, the IngressController receiving the packet selects a tunnel segment from information in the packet header and the fabric header prefixed to the packet. According to one embodiment, each EBT Segment is associated with an egress port lane identifier and a remaining hop count to the destination node serving the target egress port lane. The packet header provides the packet destination identifier, such as egress port lane EPL1, while the hop count and target destination node can be determined from the fabric header.

Referring to both FIGS. 11A and 11B, assume a packet P1 arrives at ingresscontroller $IC_0$ of node 52 destined for EPL1 on node 55. The fabric header specifies remaining fabric hops encompassing nodes 53, 54, and 55. The IngressController $IC_0$ selects the tunnel segment EBTS3 corresponding to a remaining hop count of 3, a path corresponding to destination node 55, and lane EPL1. IngressController $IC_0$ notifies EgressController $EC_1$ that packet P1 is received and the selected tunnel segment identifier. Assuming tunnel segment EBTS3 is not busy and buffers are dynamically assigned to the tunnel segment at the next hop, the EgressController $EC_1$ forwards the packet to the IngressController of node 53 at the end of the fabric link. Referring to FIG. 11B, if the tunnel segment EBTS3 is busy or buffers are unavailable for packet buffering, the EgressController stores a reference to packet P1 in a packet queue 70A corresponding to EBT Segment EBTS3 until the tunnel segment is released or buffer resources become available at the next hop.

After packet P1 traverses the fabric link to the IngressController of node 53, the packet is now two hops away from destination node 55. The EgressController of node 53 also manages a set of EBT Segments similar to $EC_0$ of node 52. Since the packet is two hops away from the packet destination, a different EBT Segment EBTS2 is selected corresponding to a remaining hop count of 2, a path corresponding to destination node 55, and lane EPL1. Similarly, on the last hop, EBT Segment EBTS1 is selected corresponding to a remaining hop count of 1, destination node 53, and lane EPL1.

It should be noted that tunnel segments can be shared by different egress based tunnels. For example, in FIG. 11A, assume packet P2 arrives at node 54, (i.e. P2's binding node), at the same time packet P1 arrives at node 54. Even though both packets have the same destination, egress port lane EPL1 on node 55, both packets are traversing different EBTs. P2 traverses an egress based tunnel having one hop originating from binding node 54, while packet P1 traverses an egress based tunnel having three hops originating from binding node 50. However, since both packets are currently one hop away from the same packet destination, the same tunnel segment, EBTS1, may be shared to traverse the last hop. Therefore, if packet P1 requests tunnel segment EBTS1 prior to packet P2, P2 will be referenced in a packet queue corresponding to the tunnel segment waiting for packet P1 to release the tunnel.

In another embodiment, tunnel segments may not be shared. Instead, individual queues would be implemented for each tunnel, that is, for each distinct path defined between a binding node and a destination channel (e.g., Infiniband™ lane) in the egress based virtual network. Such a configuration would decrease conflict between packets, but increase the number of packet queues per EgressController. The number of queues would still be less than the number of virtual channels managed in the prior destination based virtual network.

Egress based tunnels do not extend the entire diameter of a fabric, because the number of EBT segments managed at each EgressController would exceed the number of virtual channels managed in the destination based virtual network (DBVN) system. For example, if an EBT Segment were defined for each egress port lane reachable in one, two, three, four or five hops, then all possible virtual networks in a D=4 fabric supporting link failures are covered. However, this would require $N(1+\Delta+ \ldots +\Delta^D)$ segments per EgressController, where N is the number of egress port lanes per node. Since the number of destination based virtual networks is typically less than $N\Delta^D$, simply extending the concept of EBT segments in a D=4 fabric to include four and five hop paths actually increases the number of tunnel segments and, thus, increases the number of control structures. For this reason, source based virtual networks are implemented to limit the number of required control structures for managing EBT segments.

By incorporating source based virtual networks (SBVNs), the low number of tunnel segments managed by each switch EgressController is maintained and tree saturation is still avoided. The SBTs of a source based virtual network provide logical paths into the fabric for injecting packets from a packet source into egress based virtual networks originating a number of hops within the fabric.

According to one embodiment, SBTs extend the reach of packet injection to egress based tunnels whose starting point is in a fabric router zero, one or two fabrics hops away from the source node. Therefore, if a fabric has a four hop diameter, a packet can traverse the fabric with one hop in a source based tunnel and three hops in an egress based tunnel. Similarly, in a situation where a link failure occurs in a Gamma graph fabric, an alternative path with an additional hop can be traversed. Thus, in such a situation, a packet could traverse the fabric through a path with two hops in a source based tunnel and three hops in an egress based tunnel. Depending on the size of the fabric, SBTs may extend more than two fabric hops.

Regarding switch elements, each EgressController manages a set of SBT Segments for paths to binding nodes reachable from the EgressController within, for example, one or two hops away. Thus, the total number of SBT Segments managed at any one EgressController equals $N(1+\Delta)$ where N is the number of fabric ingress port lanes per source node. For example, in a D=4 fabric, an SBT Segment is required for each binding node reachable from the EgressController in one or two hops per ingress port lane. Referring to FIG. 11A, this results in an SBT Segment associated with binding node 53 and binding nodes 54 and 57, which are one hop and two hops away respectively. If there are multiple ingress port lanes serviced by each node, there is a set of such SBT Segments for each one.

In general, at any switch EgressController, the total number of tunnel segments is $N(1+\Delta)$ SBT segments and $N(1+\Delta+\ldots+\Delta^{D/2})$ EBT segments, which is approximately $N\Delta^{D/2}$ for large values of $\Delta$. This results in a total number of control structures being less than the control structures for the approximately $N\Delta^D$ virtual channels of a DBVN system. Therefore, assuming $\Delta=8$, D=4 Gamma graph fabric having 48 ingress and egress port lanes, each fabric router would manage 3936 tunnel segments per EgressController, as opposed to 145,192 virtual channels per EgressController in a destination based virtual network system.

Figure 11E:
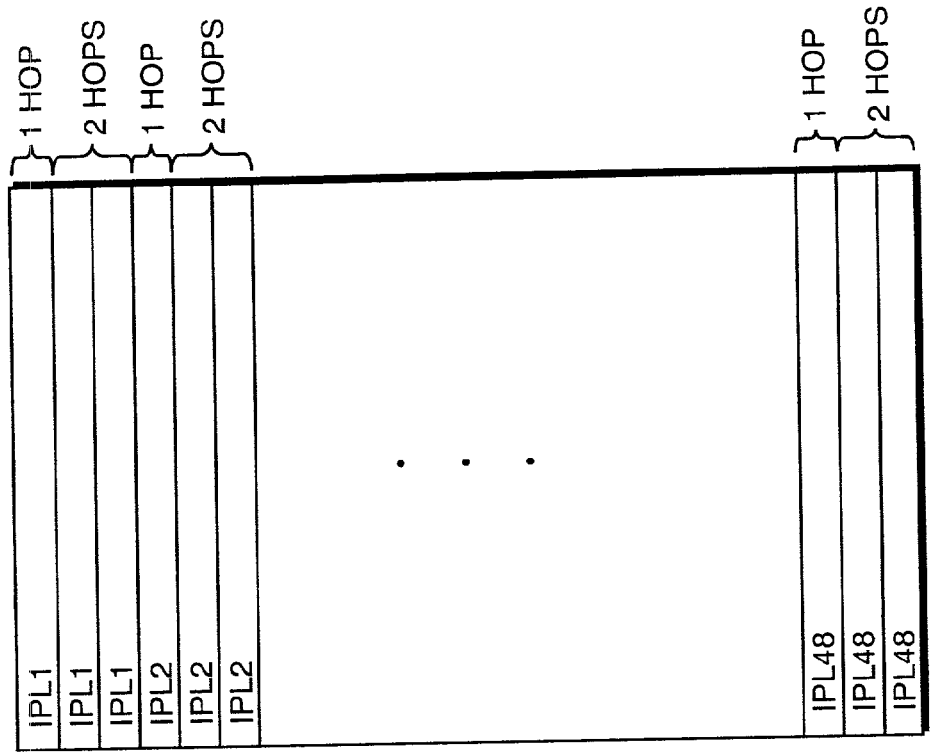
FIG. 11D and FIG. 11E illustrate alternative ways of grouping a set of SBT Segments according to embodiments of the invention.
Figure 11D:
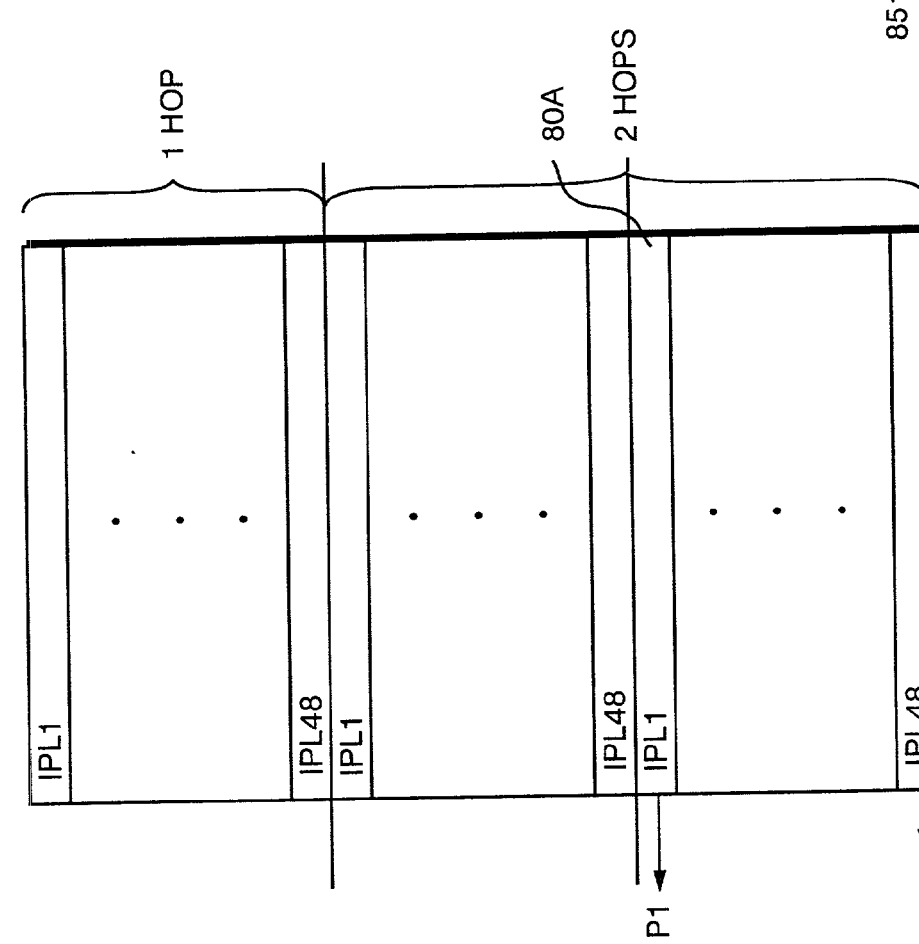

SBT Segments may be managed with control structures, such as packet queues. FIG. 11D and FIG. 11E illustrate alternative ways of grouping a set of SBT Segments queues, 80 and 85, according to embodiments of the invention. For example, assuming each fabric router services 48 ingress port lanes, the ensemble of SBT Segment queues 80 managed by each switch EgressController can be partitioned into groups sharing the same path to a common binding node as illustrated in FIG. 11D. Alternatively, the ensemble of EBT Segment queues can be partitioned into groups having the same ingress port lane identifier, but different paths to binding nodes as in FIG. 11E.

As a packet traverses each hop of a source based tunnel, an SBT Segment is selected to extend the tunnel to the next hop. In particular, the IngressController receiving the packet selects a tunnel segment from information in the packet header and the fabric header prefixed to the packet. According to one embodiment, each SBT Segment is associated with a packet source identifier, (e.g., fabric ingress port lane identifier) and a remaining hop count to a binding node of a particular egress based virtual network. The packet header provides the packet source identifier, such as ingress port lane IPL1, while the hop count and target binding node can be determined from the fabric header.

As described previously, the Traffic Manager may be coupled to the switch element by an access link. Thus, packets must traverse an internal hop from the Traffic Manager to the switch element. Accordingly, the Egress-Controller in each Traffic Manager ($EC_{TM}$) manages a set of SBT segments corresponding to tunnels extending binding nodes within 0, 1 or 2 hops of the EgressController. Thus, the EgressController in the Traffic Manager supports a total of $N(1+\Delta+\Delta^{D/2})$ SBT segments where N is equal to the number of ingress port lanes per node.

Referring to FIG. 11A, assume a packet P1 arrives from an external link on fabric ingress port lane IPL1 of node 52. The packet is received by the Traffic Manager 320 which appends a fabric header to the packet specifying each hop through the fabric to the packet destination as well as a hop count. The hop count indicates the relative number of hops remaining to a binding node that allows packets to transition into the target egress based virtual network. Typically the path is specified as a sequence of switch egress port identifiers.

According to one embodiment, the packet may be segmented into fixed size data blocks, referred to as flow control units or "flits," in order to reduce buffering requirements within the switch and latency. A packet can be partitioned into head, body, and tail flits. Alternatively, for smaller packets, the packet can be converted into a single flit, referred to as an OnlyFlit, including the entire packet with a flit header.

The EgressController $EC_{TM}$ injects the packet P3 (or head flit) into one of the managed SBT Segments corresponding to the packet source, IPL1. The selected SBT Segment SBTS3 originates a source based tunnel to a binding node endpoint. Assuming that the fabric header specifies a path encompassing nodes 53, 54, 55, etc. and a remaining hop count of 3, the packet will be injected into an SBT Segment corresponding to a remaining hop count of 3, a path corresponding to binding node 54, and lane IPL1. The remaining hop count from binding node 54 is three, because there is one additional internal hop over the access link coupling the Traffic Manager 320 to the IngressController $IC_2$ of switch 310. Assuming buffer resources are dynamically allocated to the selected tunnel segment, the packet traverses the access link to IngressController $IC_2$.

The IngressController $IC_2$ selects the SBT Segment SBTS2 corresponding to a remaining hop count of 2, a path corresponding to binding node 54, and lane IPL1. Ingress-Controller $IC_2$ notifies EgressController $EC_1$ that packet P3 is received and provides the selected tunnel segment identifier. Assuming the tunnel segment is not busy and buffers are dynamically assigned to the tunnel segment at the next hop, the EgressController $EC_1$ forwards the packet to the IngressController of node 53 at the end of the fabric link. Referring to FIG. 11D, if the tunnel segment SBTS2 is busy or buffers are unavailable for packet buffering, the Egress-Controller $EC_1$ stores a reference to packet P3 in a packet queue 80A corresponding to SBT Segment SBTS2 until the tunnel segment is released or buffer resources become available at the next hop.

After packet P1 traverses the fabric link to the Ingress-Controller of node 53, the packet is now one hop away from binding node 54. The EgressController of node 53 also manages a set of SBT Segments similar to $EC_1$ of node 52. Since the packet is one hop away from the binding node 54, a different SBT Segment SBTS1 is selected corresponding to a remaining hop count of 1 and lane IPL1. Again, assuming the tunnel segment is not busy and buffer resources are dynamically allocated to SBTS1 at the next hop, packet P3 traverses the fabric link to the IngressController of node 54. At node 54, the packet will transition into an appropriate egress based virtual network as described previously.

Like EBT Segments, SBT Segments can be shared by different source based tunnels. For example, in FIG. 11A, assume packet P4 from fabric ingress port lane IPL1 is received by an IngressController $IC_2$ of node 53, (i.e. P4's source node), at the same time packet P3 is received by another IngressController at node 53. Even though both packets are targeted for the same binding node (i.e., node 54) and have the same ingress port lane identifier IPL1 on node 55, both packets are traversing different SBTs. P3 traverses a source based tunnel having three hops (one internal hop and two fabric hops) originating from source node 52, while packet P4 traverses a source based tunnel having one hop originating from source node 53. However, since both packets have the same ingress lane identifier IPL1 and are currently one hop away from the same target binding node, the same tunnel segment, SBTS1, may be shared to traverse the last hop. Therefore, if packet P4 requests tunnel segment SBTS1 prior to packet P3, P3 will be referenced in a packet queue 80A corresponding to the tunnel segment waiting for packet P4 to release the tunnel.

In another embodiment, SBT Segments may not be shared. Instead, individual queues would be implemented for each tunnel, that is, for each distinct path defined between a source node and a binding node. Such a configuration would decrease conflict between packets, but increase the number of packet queues per EgressController. The total number of SBT/EBT Segment queues would still be less than the number of virtual channels managed in the prior destination based virtual network.

Figure 11F:
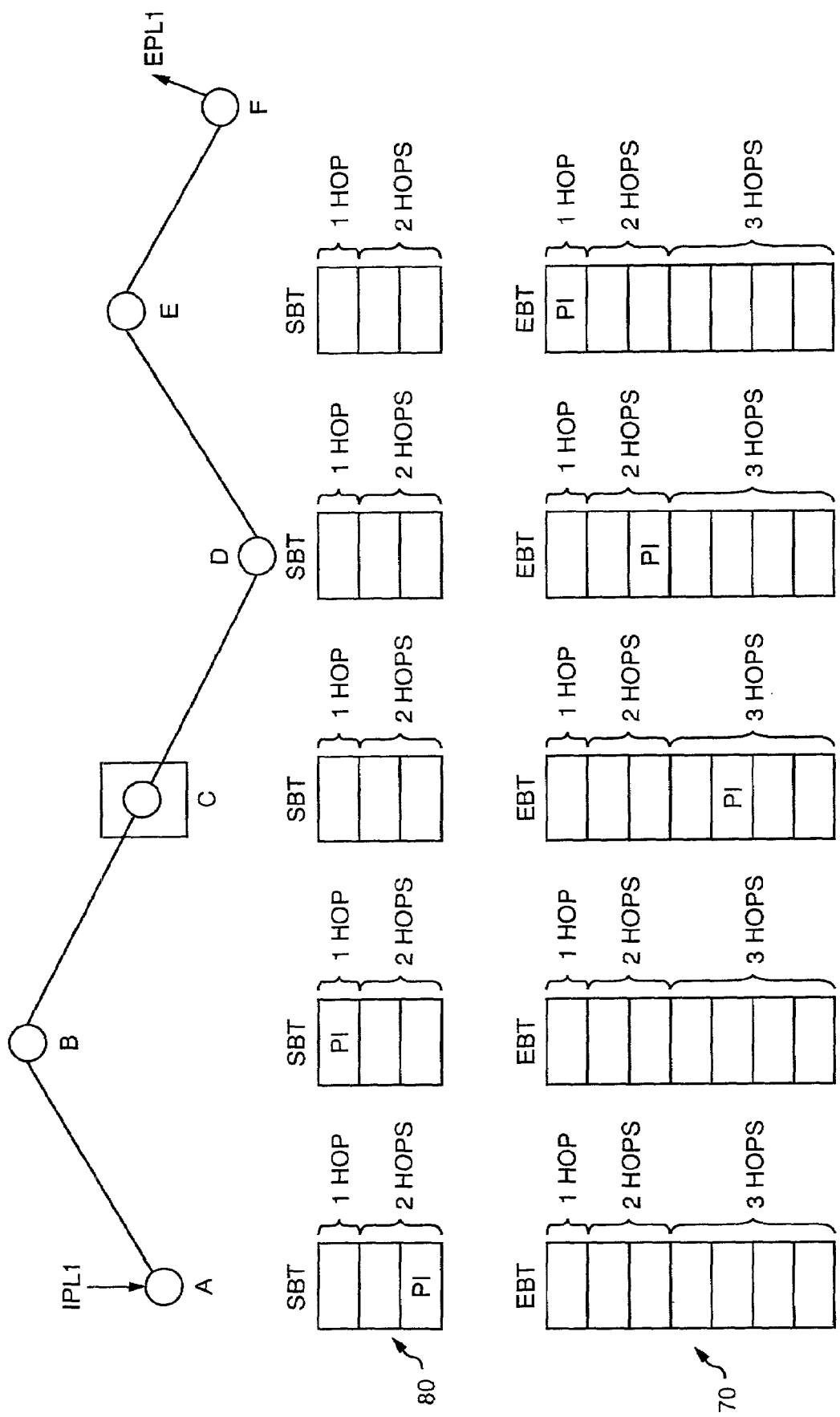
FIG. 11F illustrates packet traversal at each hop along a source based/egress based virtual network path according to one embodiment.

FIG. 11F illustrates the packet traversal at each hop along a source based/egress based virtual network path according to one embodiment. Assuming each node has one fabric ingress port and one fabric egress port, a packet P1 is initially injected into a source based tunnel segment corresponding to an SBT that is two hops away from its binding node C. The packet may be temporarily queued in one of the packet queues 70 selected by the ingress lane number and hop count. After packet P1 traverses the fabric link to node B, P1 is now one hop away from binding node C. Therefore, packet P1 is assigned to an packet queue corresponding to a SBT Segment one hop away from the target binding node. Once packet P1 reaches binding node C, it transitions into an EBT Segment corresponding to its target destination that is three hops away. As packet P1 traverses the egress based tunnel originating from node C, it may be temporarily queued in packet queues corresponding to the packet destination and the number of remaining hops to reach it. Buffer resources (not shown) are dynamically allocated to the selected tunnel segment as the packet traverses the tunnel. This provides more efficient utilization of expensive buffer resources.

An event driven routing approach, such as that described in PCT Patent Application Serial No. PCT/US98/16762, entitled "Router with Virtual Channel Allocation," filed Aug. 20, 1998, and published as WO99/11033, may be extended to support embodiments of the present invention with source based virtual networks and egress based virtual networks.

Packets are typically transported across a fabric as an ordered sequence of flits using a technique called wormhole routing. With wormhole routing, the head flit of a packet traverses a predetermined path across the fabric. As the head flit traverses each switch element, buffer and control resources needed to forward the packet across the switch are allocated to the packet. The remaining flits of the packet transit the fabric via the path established by the head flit using the resources reserved by the head flit. As the tail flit of a packet transits a Switch element, the resources allocated by the head flit are released for reallocation.

In more detail, packets forwarded through the fabric typically range in size from 60 bytes to 4 k bytes. Packets received at an Infiniband ingress port are stripped of extraneous information and then stored in a memory controlled by the Traffic Manager.

As a packet is injected into a Source Based Tunnel (SBT), a header is prefixed to the packet and the augmented packet is segmented into 40-byte flits. Longer packets are transported across the fabric as an ordered set of head flit, zero or more body flits and ending with a tail flit. The head and body flits typically contain 40-bytes. To minimize fragmentation losses, the tail flit of a packet can contain 40, 50, 60 or 70 bytes. Packets shorter than 71-bytes are transported across the fabric as a OnlyFlit. OnlyFlits are equivalent to a head flit and tail flit combined. An OnlyFlit can contain 40, 50, 60 or 70 bytes including the packet header. A four byte flit header is transported along with each flit. The flit header contains multiple fields including a next hop field and a hop identifier.

As previously stated, destination based virtual networks facilitated the forwarding of packet across a fabric on a high or low priority virtual network associated with a particular destination node. For small fabrics having a single egress port and two priorities, this scheme both prevents deadlock and tree saturation. At each fabric ingress port, a fixed number of flit buffers was associated with each virtual network. The number of flit buffers associated with each fabric was dictated by the forwarding velocity required. Typically 4–6 flit buffers were required to achieve link rate forwarding rate. Simulations of this scheme demonstrated deadlock and tree saturation free operation. The simulations also demonstrated under-utilization of the expensive flit buffer resources. To allow larger fabric sizes and up to 48 egress port lanes per node, the number of buffers would need to increase by a prohibitive two orders of magnitude. Thus while the invention of virtual networks solves the problems of tree saturation, the system is difficult to scale for very large fabrics.

Since with normal traffic loads, only a few packets sourced from each node are traversing the fabric, embodiments of the present invention dynamically assign buffer resources to source based and egress based virtual networks (i.e., EBT Segments and SBT Segments) upon request.

To decouple flit buffer resources from virtual networks, embodiments of the invention associate a set of lanes with each link. Each lane has an associated pair of flit buffers at the downstream end of the link. To increase the forwarding velocity, buffers from a pool of flit buffers can be dynamically used by a lane up to a configurable maximum number. With normal traffic conditions, only a small number of lanes will be in use at one time so that each lane can utilize the maximum number of flit buffers.

Lanes are partitioned into lane groups assigned to each path hop. Lane groups prevent deadlock, which occurs in situations where dependency loops come into existence with a only single group of lanes dynamically assignable to virtual networks. The localized deadlock created by a single dependency loop typically causes a system wide deadlock as more and more links exhaust their pool of lanes. Therefore, by partitioning lanes into lane groups, deadlock is prevented because dependency loops can never be formed. Only lanes in lane group K can be assigned to transport packets K hops away from their destination. Implementing approximately 30–40 lanes in each lane group reduces the probability of lane exhaustion to extremely low values even for the largest fabric sizes.

Unlike virtual networks which have global scope, lanes are strictly local. A lane in lane group K is used to transport a packet across the associated link if and only if the packet is K hops away from its destination. Thus the lane identifier used on successive links are always different. Since lanes within a virtual network are dynamically assigned to a partially formed tunnel, two packets traversing the same virtual network over the same path will typically employ a different lane for each hop for each packet.

Lanes are managed and allocated by an EgressController at the head end of each link. Like tunnel segments, lanes have the concept of being busy (i.e., assigned to a packet transport) or non-busy (i.e., available to be assigned to a packet). Lanes are assigned to partially formed tunnels as the head flit of the packet arrives at a node. Typically, a lane is released when the tail flit of a packet is forwarded from the downstream flit buffer memory.

A packet is transported from the EgressController at the upstream end of a link to an IngressController at the downstream end of a link utilizing the control structures associated with a particular lane. Such control structures is described in more detail with respect to FIG. 13.

Figure 12:
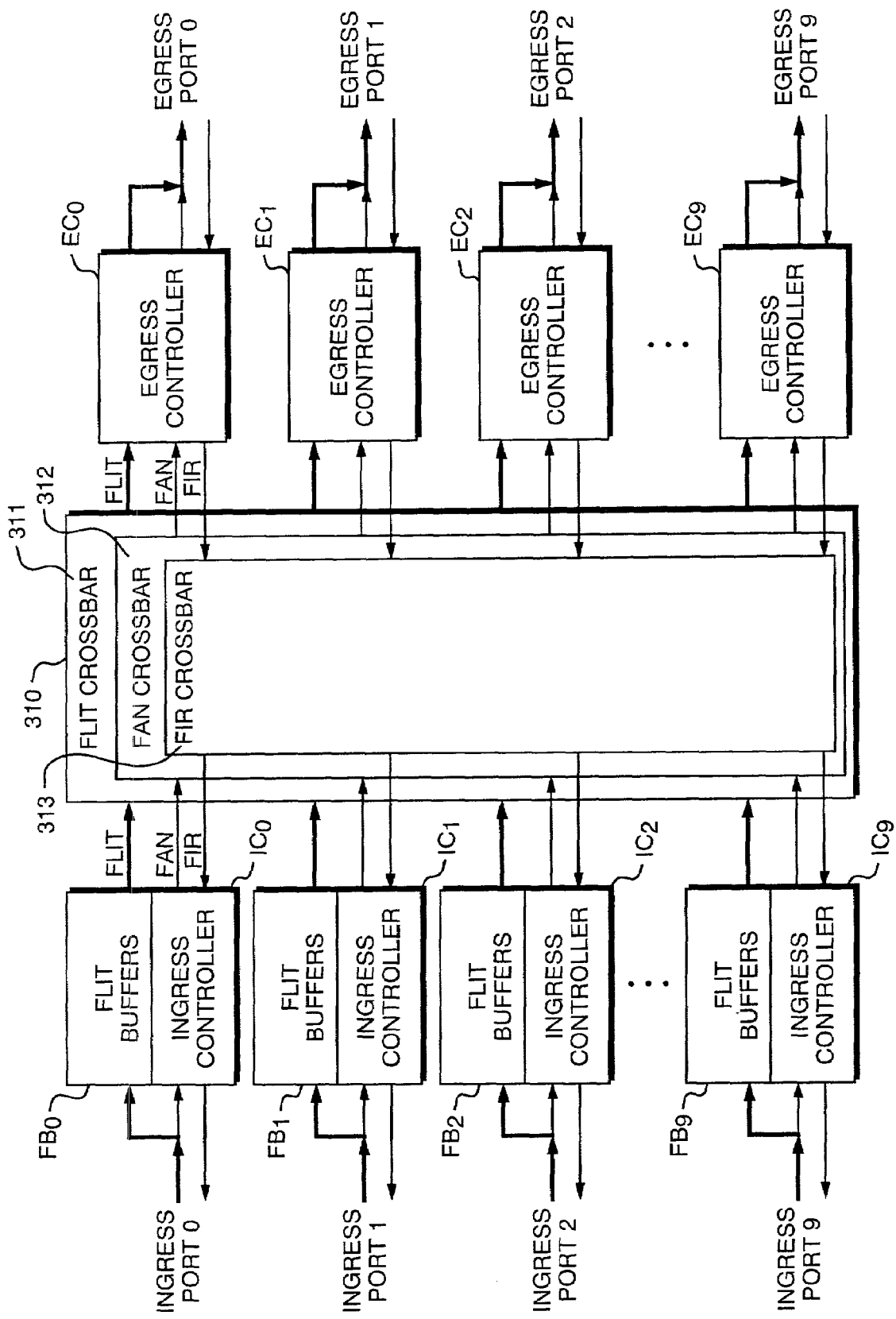
FIG. 12 illustrates a switch element according to one embodiment in more detail.

FIG. 12 illustrates a switch element according to one embodiment in more detail. In addition to control structures, two flit buffers (e.g., $FB_0$) in the flit memory associated with the IngressController (e.g., $IC_0$) are dedicated to the lane. According to one embodiment, 128 lanes are implemented partitioned into 3, 4, 5 or 6 lane groups. Flit memory holds 512 40-byte flits of which 256 are dedicated to particular lanes and 256 are dynamically assignable to lanes.

Packets arrive at an ingress port as an ordered sequence of flits. While there may be instances where all the flits of one packet arrive back-to-back at an ingress port, the typical case has flits of multiple packets arriving at an ingress port in a relatively uncoordinated manner.

A flit header is forwarded with each flit payload. Each header contains a 7-bit lane field to identify the lane, a four-bit next hop field and a 3-bit flit type field. The lane identifier allows a downstream IngressController to select the lane's control structure. The type field allows checking for flit sequencing errors. For example, two head flits having the same lane number cannot arrive back-to-back over the same lane.

An upstream EgressController will never forward a flit downstream unless there is an empty flit buffer into which the flit can be stored. Thus it is the upstream EgressController which manages the downstream flit memory. To minimize the number of bits transferred in each flit header, the address of the one or two flit buffers into which the flit will be stored is not forwarded in the flit header. Rather the address is dynamically created by the IngressController as the flit arrives.

As each flit arrives, the Ingresscontroller looks up the lane's state structure and then synthesizes a Flit Arrival Notification (FAN) message. The created FAN is immediately forwarded to the EgressController specified in the flit header's next hop field. The flit is stored in one of the dedicated buffers assigned to the lane or into one of the pool buffers usable by all lanes. The lane's state structure is updated immediately following the arrival of the last 10-bytes of the flit.

According to one embodiment, each flit header contains a flit checksum. If a checksum violation is detected by the IngressController, it returns a message over the credit segment (e.g., bandwidth channeling control messages from the IngressController to the upstream EgressController to the head-end) indicating which flit was received in error. All subsequent flits after receiving an errored flit are dropped until a retransmission code is detected.

As the head flit of a packet is received, the IngressController creates a segment identifier from the next hop fields contained in the flit header and packet header. The segment identifier selects a tunnel segment (e.g., approximately 4,000 segments for a $\Delta=8$, $D=4$ Gamma graph fabric) to be added to the partially completed tunnel. This segment identifier is both stored in the state structure associated with the lane and included in the synthesized FAN. For body flits and tail flits, the IngressController creates a FAN including a segment identifier read from the lane's state structure.

A natural clock frequency for operating the core of each switch is the byte arrival rate. This implies that flits arrive no more often than once every four clock cycles. Since packets can arrive at each of the ten ingress port all bound for the same egress port, the maximum FAN arrival rate at any one EgressController is 2.5 FANs per clock cycle. Since implementing an EgressController fast enough to handle the maximum FAN arrival rate is prohibitively expensive, a mechanism must be implemented to handle the case where the offered FAN rate exceeds the FAN processing rate of an EgressController. The design and construction of FAN backpressure systems are known by those skilled in the art.

It is assumed that regardless of which FAN backpressure scheme is adopted, that FANs are delivered to the FAN Crossbar 312 in the same order as they arrived. The FAN Crossbar 312 may utilize a round-robin arbitration scheme between those ingress ports offering FANs to be processed. This guarantees that FANs are processed more or less in the order of their arrival at the switch and that the interval between a flit's arrival and the EgressController's processing of the associated FAN is bounded.

Each EgressController receives FANs and Flits from IngressControllers in the same switch and Credits from the downstream IngressController via the reverse path of the link. As a general rule, the receipt of a Credit always signifies the availability of 1 or 2 downstream flit buffers. Flits received by the EgressController are immediately injected into the head end of the link. FANs received by the EgressController are either stored or are converted into a Flit Injection Request (FIR) and forwarded to the IngressController sourcing the FAN. Credits received by an EgressController may result in a FIR being forwarded to one of the switch's IngressControllers and always cause a state structure to be updated. All flit forwarding decisions occur as a by-product of the EgressController either receiving a FAN or Credit. Note that all ten EgressControllers make flit forwarding decisions independently. There is no centralized decision entity forming a throughput bottleneck.

Each FAN delivered to an EgressController by the FAN Crossbar 312 includes a type field identifying it as a head, body, tail or singleton, a lane identifier and a tunnel segment identifier. The first operation performed by an EgressController on a FAN's arrival is to lookup state structures indexed by the lane and segment identifiers. In general, the arrival of a head or singleton FAN utilizes only the segment state structure while the arrival of a body or tail FAN utilizes only the lane state structure.

As a FAN is received, the EgressController must make a decision on whether to store the FAN or convert it to a FIR. The decision process depends on whether the FAN is associated with a head flit/OnlyFlit or not and whether any lanes are available or not. If a new packet FAN is received and the segment is busy forwarding a previously arrived packet, the FAN is queued and no FIR is produced. If the segment is nonbusy and a lane is available, the lane is assigned to the packet, the segment is marked as busy and a FIR is produced. If the segment is nonbusy and no lane is available, the FAN is stored and no FIR is produced.

As a Credit is received, the EgressController must also make a decision on whether to create a FIR or simply update a state structure. As a general rule, the receipt of a Credit always signifies the availability of 1 or 2 downstream flit buffers. Thus the receipt of a Credit immediately triggers creation of a FIR if a FAN waiting for the availability of a credit is stored within the EgressController.

An EgressController is composed of state, pointer, availability and ready structure arrays together with a small number of finite state machines (FSMs). The FSMs manipulate fields within the various structures, manage the FAN FIFOs, process FANs, process Credits, create FIRs, detect packets bound to malfunctioning destination nodes, and monitor inconsistency.

According to one embodiment, an EgressController supports a total of 1,280 lanes, one for each of the 128 lanes on each of ten ingress ports. To support five-hop fabrics where each node supports a maximum of 24 egress ports each having two priorities, a total of 48(2(1+8)+64)=3,936 segments must be supported.

It is possible for one EgressController to receive FANs from each of the IngressControllers which must be stored rather than immediately converted to FIRs. In the worst case, one EgressController can receive 512 FANs from each of the IngressControllers. Hence the EgressController may need to store up to 5,120 FANs for later conversion to FIRs. Since EgressController control memories must reside on-chip, control structure architectures which minimize the total amount of overall control structure memory are extremely desirable.

Embodiments of the invention employ to minimize the aggregate amount of per EgressController control memory. These embodiments exploit the fact that while there are a large total number of lanes, tunnel segments and stored FANs, the number in use at any one time is typical small.

Tunnels through the fabric are created by the head flit of packet arriving at an EgressController and finding a nonbusy tunnel segment with which to extend the tunnel. We call FANs associated with the first flit of a packet a Packet Arrival Notification (PAN). FANs associated with body flits or the tail flits are called nPANs (i.e. non-PANs). When a PAN arrives and finds the segment busy, the EgressController adds the PAN to a queue of PANs waiting on the segment. Thus, an arbitrary length queue of PANs could be associated with a segment.

When an nPAN arrives at the EgressController, it could be part of a packet stalled at a partially complete tunnel or part of a tunnel which has been extended over the link associated with the EgressController. If the nPAN is part of a stalled packet, the nPAN is added to a queue of nPAN waiting for the tunnel extension to be successful. Thus an arbitrary length queue of nPANs could be associated with each of the 1,280 ingress lanes.

FIG. 13 is a table illustrating a set of control structures managed by a EgressController according to one embodiment. In particular, the table describes the logical memories used to hold the state, availability, ready and pointer arrays for a Gamma graph having a switch radix $\Delta=8$ and $D=4$.

There are three arrays of state structures managed by each EgressController. An array of 1,280 IngressPacketState structures allows managing the processing of packets whose head flit has been received at an ingress port but whose tail flit has not been received. Each IngressPacketState structure contains the following fields:
State (2 bits)—indicates state of the segment;
Head (13 bits)—pointer to first FAN not injected into egress segment;
Tail (13 bits)—pointer to last FAN not injected into egress segment;
lane (7 bits)—egress port lane number used to forward flits of the packet;

Each of the 128 lanes used to transport packets from the switch egress port controlled by the EgressController downstream is managed via an EgressLaneState structure. Since EgressLaneState structures are allocatable, an EgressController also maintains a 128-flag array of AvailableEgressLane flags to allow quickly finding which lane are busy/available. Each EgressLaneState structure indicates the number of downstream input flit buffers available to the lane, the number of overall credits it has, and the location of the next FAN to be injected into the fabric should resources for that injection become available. Each EgressLaneState structure contains the following fields:
State (2 bits)—state of lane;
DedicatedCredits (2 bits)—number of downstream dedicated Input Flit Buffers used by this lane;
SharedCredits (2 bits)—number of downstream shared Input Flit Buffers used by this lane;
NextFan (13 bits)—pointer to next FAN to be added to the lane;
segment (12 bits)—segment number on which lane is moving.

A 512 element FanState array contains FAN waiting to be converted into FIRs and pointers which allow creating a linked list of packets waiting on a particular segment and a linked list of FANs comprising a particular packet. FanState structures are allocatable. Thus EgressController also maintains a 512-flag array of AvailableFanState flags to allow quickly finding which FanState structures are busy/available. Each FanState structure is composed of fields extracted from each processed FAN together with pointers to the next FAN in the packet and pointers to the first FAN of the next packet waiting on the same segment. Each FanState structure contains the following fields:
NextFan (13 bits)—pointer to next FAN in the same packet;
NextPacket (13 bits)—pointer to the next packet waiting on the segment;
IngressPort (4 bits)—index of the ingress port receiving the flit;
FlitBufAdr0 (9 bits)—address of the Input Flit Buffer holding the first 40-bytes of the flit;
FlitBufAdr1 (9 bits) address of the Input Flit Buffer holding the remaining bytes of a fat flit;
FlitType (3 bits)—type of flit;
FlitSize (2 bits)—size of flit (40, 50, 60, 70 bytes)

Figure 14:
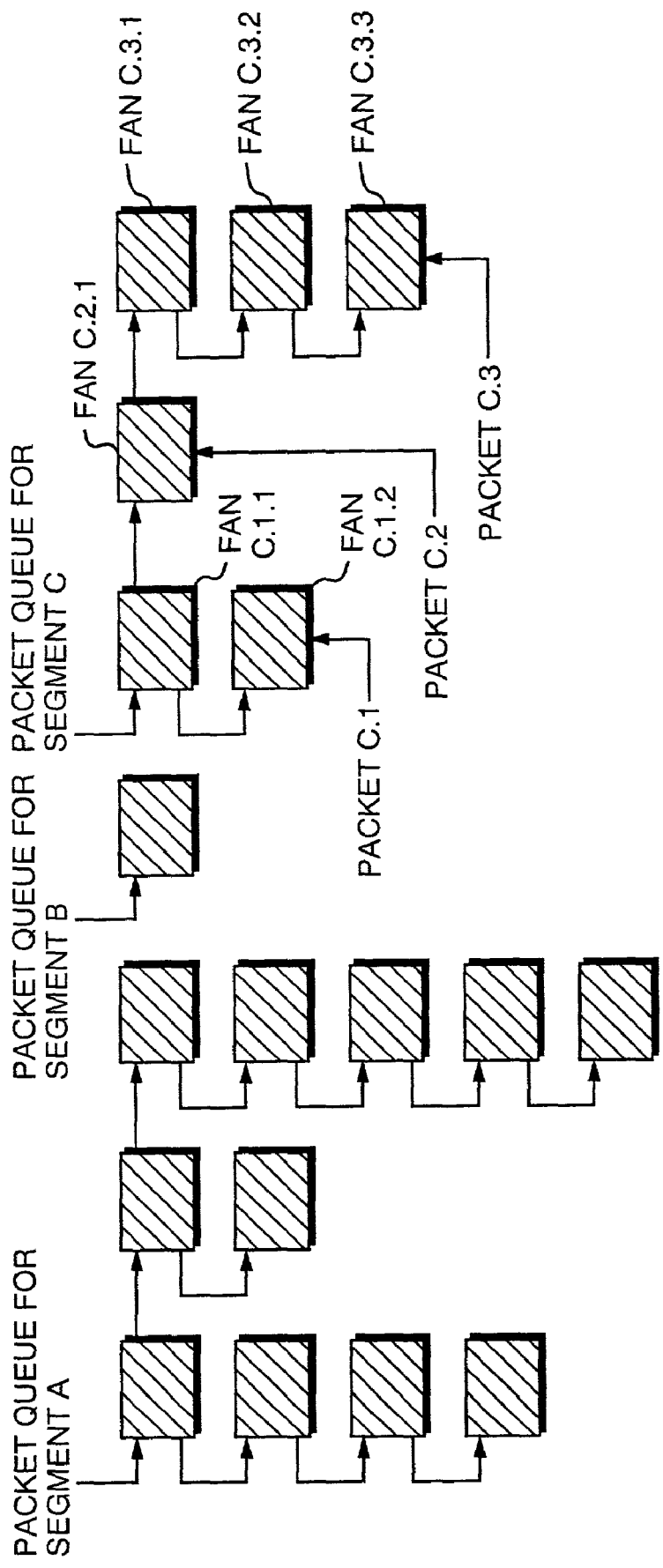
FIG. 14 illustrates the linking of FANs forming a packet and the linking of packets waiting on a segment for multiple segments according to one embodiment.

FIG. 14 illustrates the linking of FANs forming a packet and the linking of packets waiting on a tunnel segment for multiple tunnel segments according to one embodiment. Referring to a tunnel segment C, if Segment C is busy or there is currently no flit buffers available, packets must be queued for transmission over the tunnel segment. In particular, if a PAN, such as FAN C.1.1, is received by the EgressController for the head flit of a packet C.1, FAN C.1.1 is referenced by a pointer in the SegmentPointer array corresponding to Segment C. Packet C.1 shall be the next packet to traverse Segment C once it becomes available. The SegmentPointer array contains pointers to queues of packets waiting on a particular segment. If another PAN, such as FAN C.2.1, for a head flit of another packet C.2 is received, it is linked to FAN C.1.1 as the NextPacket waiting to traverse the Segment C. Packet P2 shall not traverse the tunnel segment until all the flits of packet C.1 have traversed Segment C. Therefore, if a nPAN, such as C.1.2, is received by the EgressController, it is referenced in FAN C.1.1 as NextFAN corresponding to the next flit in the same packet to traverse the segment. Thus, all the flits of a packet must traverse the tunnel segment before the next packet can traverse the same tunnel segment.

There are three arrays of waiting flags (e.g., one bit structures) associated with each EgressController. Each waiting array contains flags indicating that some task is waiting to be processed as soon as some EgressController resource becomes available. For example, when a PAN is processed by EgressController and no PANs are currently waiting on the segment, EgressController attempts to convert the FAN into a FIR. Its first task in converting the FAN to a FIR is to allocate a lane. Normally, there is a lane available to be allocated. Occasionally no lanes are available. When this occurs, EgressController will set a flag in the WaitingForlanes array indexed by Segment Identification Number (SID).

Credits can be received at a peak rate equal to twice the FAN to FIR conversion rate of an EgressController. If a FAN is waiting on the availability of a downstream credit, a mechanism is employed to create a work queue of FAN to FIR conversion requests. When a FAN to FIR conversion must be initiated as a result of credit processing and EgressController cannot immediately perform the conversion, a flag by segment is set in the WaitingForFSM array. Later, when EgressController can perform the conversion, a round robin arbitration is employed to select a segment and the conversion is initiated.

When the EgressController determines that a FAN can be immediately converted into a FIR, it also checks that the FIR FIFO associated with the IngressController sourcing the FAN is full or not. If the FIR FIFO is not fill, a FIR is immediately created and stored into the FIR FIFO. If, however, the FIR FIFO is full (a rare case), the EgressController will set a flag in an array of WaitingForFirFifo flags associated with the IngressController sourcing the FAN. Since a lane has been assigned to packet at this point, each of the ten WaitingForFirFifo arrays may contain only 128 flags, one for each possible lane.

There are two arrays of pointer structures associated with each EgressController. The SegmentPointer array contains 3,936 pointers to queues of packets waiting on a particular segment. For a D=4 fabric, the array is partitioned into 48*(1+8) pointers for the source relative tunnel segment and 48*(1+8+64) pointers for the destination relative tunnel segments. Each 13-bit SegmentPointer element either is zero, indicating that no packets are queued on the segment, or a pointer to an element in the FanState array. If the pointer is less than 512, the FanState structure is dedicated to the EgressController. If the pointer is greater than 511, the FanState structure is shared between all the EgressControllers.

FANs are created by an IngressControllers on receipt of a flit and forwarded to the EgressController specified in the flit header's NextHop field via a FanFIFO unique to the ingress/egress port pair. Each FAN created by an IngressController includes the following fields:

FlitType (3 bits)—type of flit;
FlitSize (2 bits)—size of flit (40, 50, 60, 70 bytes)
FlitBufAdr0 (9 bits)—address of the Input Flit Buffer holding the first 48-bytes of the flit;
FlitBufAdr1 (9 bits)—address of the Input Flit Buffer holding the remaining bytes of a fat flit;

SegmentIdentificationNumber (12 bits)—identifies which of 48(1+8+64+8+1) segments the flit is carried on;
lane (8 bits)—identifies the ingress lane on which the flit was carried.

FANs are delivered to the FAN processing FSM within EgressController after selection of a FAN from one of the twelve FanFIFOs. This selection process also produces a 4-bit IngressPort number which supplements the FAN fields sourced by the IngressController. To reduce latency, a FAN is typically forwarded before the last segment of the flit is received. Since it is possible for flits to have errors, an abort signal is also forwarded to the EgressController shortly after the FAN. This abort allows the EgressController to begin looking up the various state structures needed to process the FAN but occurs before the EgressController changes the state of control structures.

The segment Identification Number (CIN) provides a mechanism for EgressController to maintain the order of packets. Each CIN value indicates that the packet was sourced from a particular source node's ingress port or is bound to a particular destination node's egress port. The lane Identification Number (TIN) together with the IngressPort number allows the EgressController to create a unique packet identification number. This allows EgressController to form an ordered list of FANs for each lane received on an ingress port.

EgressController's first operation after FAN selection is to fetch a FanQueuePointer pointer from the SegmentPointer array via the CIN index and fetch a FanState pointer form the IngressPacketState array via the eTIN index. Since both these fetches do not change control structure state, they can be initiated prior to receipt of the possible abort due to a flit received with errors.

If the SegmentPointer pointer is null (i.e. no queue of lanes has previously been setup), the FAN must be associated with a HeadFlit or OnlyFlit or a consistency error is triggered. If the SegmentPointer is not null, the pointer is used to fetch the FanQueuePointer structure either from the local FanQueuePointer memory or the shared Fan-QueuePointer memory. Again, because the FanQueuePointer structure fetch does not change control states, it can occur prior to receipt of the possible abort due to a flit received with errors.

An EgressController has twelve FAN FIFOs, one for each IngressController. FANs are created by each IngressController no more often than one FAN every four clock cycles. Since multiple IngressControllers can target the same EgressController, it is possible for the peak FAN arrival rate to be substantially in excess of one FAN every four clock cycles. For example, if each of the IngressControllers were to receive a new FAN every four clock cycles and forward the FAN to the same EgressController, the peak FAN arrival rate would be three FANs per clock cycle. The average worst case expected fabric link loading is approximately 75%. This implies that 45.9%/37.2%/13.6%/2.9% of the time, 0/1/2/3 IngressControllers are forwarding FANs to a particular EgressController.

If the EgressController services one FAN every two clock cycles, only 3.3% of arriving flits will every experience delays in being processed by the EgressController. A processing rate of one FAN every two clock cycles, however, is an aggressive implementation goal. Moreover, to be effective in reducing delay, the read-out bandwidth of the memory holding flits as they arrive must also allow accessing a flit every two clock cycles. This in turn requires that the FlitCrossbar bandwidth be a factor of two larger than the minimum required. Thus, according to one embodiment, each of the EgressControllers processes at an average rate of one new FAN every four clock cycles with a processing rate goal of one FAN every two clock cycles.

As each FANs is extracted from a FAN FIFO, a test is made to determine whether the FAN can be converted into a FIR and stored in the FIR FIFO associated with the IngressController sourcing the FAN. If the test fails, the FAN is stored in FlitState memory.

Each FIR stored in a FIR FIFO by the EgressController represents one flit to be forwarded across the associated fabric link. Each flit forwarded across the link will result in a Credit being returned by the downstream node. Since there is no mechanism for throttling Credits, the EgressController is required to process each arriving Credit at its peak rate of one Credit every two clock cycles. It is expected that a returning Credit for each FIR is generated by the Egress-Controller.

To prevent head-of-line blocking, FIRs are stored in one of twelve FIR FIFOs associated with each IngressController. Since each FIR stored in the FIR FIFO is caused by the IngressController having created a FAN and forwarding the FAN to one of the EgressController, the average arrival rate of FIRs must equal the average flit arrival rate. Thus, it is expect the average FIR arrival rate to be one FIR every four clock cycles.

FIRs can be forwarded to a particular IngressController from all twelve EgressController. Since FANs are sometimes stored and only later converted to FIRs, it is possible for multiple EgressControllers to forward FIRs to one IngressController simultaneously thereby creating congestion. While the FIR FIFOs can be made large enough so that the probability of filling a FIR FIFO by one EgressController is low, the probability is non-zero. Thus the EgressController must handle the case where it could create a FIR but cannot because the FIR FIFO into which it would store the FIR is full. This event is referred to as FIR FIFO exhaustion and it is expected to be rare even for modest FIR FIFO sizes (i.e. eight entries).

When a FirFifoExhaustion occurs, an EgressController defers creating a FIR and stores the FAN instead. At this point in the processing, a lane has been assigned and credits to forward the flit are available. To create some later event which will cause the FIR to be created and stored in the FIR FIFO when it becomes non-full, an EgressController sets a WaitingForFirFifo flag associated with the congested FIR FIFO by lane number. With the modest number of lanes, total storage requirements per EgressController for all ten FIR FIFOs is only 2,304 bits.

Since FIR FIFO exhaustion should be a rare event, a processing rate of one FIR stored in a FIR FIFO resulting from a FirFifoExhaustion event every four clock cycles is adequate regardless of whether a two cycle FAN processing rate is achieved or not.

Fields from IngressPacketState and FanQueuePointer structures together with the FAN type specify the Egress-Controller task to be executed. In general, if a FAN is not a flit of the oldest segment lane, it is always queued. If a FAN is a flit of the oldest segment lane and other flits of the oldest segment lane are currently queued, the newly arrived FAN is queued. Only when a FAN is a flit of the oldest segment lane and no other flits of the oldest segment lane are queued is a test done to determine if the FAN can be converted into a FIR.

When a FAN is ready to be converted into a FIR, the EgressController first performs a lane resources test and if successful then performs a FIR FIFO test (i.e. is there room in the FIR FIFO to store the generated FIR). If both the lane resource and FIR FIFO tests are satisfied, EgressController immediately converts the FAN to a FIR and stores the FIR a FIFO associated with the IngressController sourcing the FAN.

The lane resource test depends on FAN type. If the FAN is a Head-FAN or OnlyFAN, the EgressController must assign an available lane. If a lane is not available, a flag is set in the WaitingForlanes array and the FAN is queued. Later, when a lane does become available, the newly available lane is assigned to one of the segments waiting for a lane resource.

After the lane is assigned to the packet, the EgressController then determines if there is room in the FIR FIFO associated with the IngressController sourcing the FAN. If no room is available in the FIR FIFO, a WaitingForFirFifo flag is set. Later, when the IngressController extracts a FIR from the FIR FIFO, the EgressController will select a lane waiting on FIR FIFO availability, dequeue the oldest FAN of the segment, construct a FIR, and store the FIR in the FIR FIFO. The algorithm is guaranteed not to deadlock because buffer, FIR FIFO, and lane resources are allocated by hop number.

If the FAN is a BodyFAN or TailFAN and part of the oldest lane queued on a segment, the FAN may still not be converted to a FIR because there may be no credits available or the FIR FIFO may be full. If no credits are available, the FAN is queued and a EgressLaneState NumberWaitingFlits counter is incremented. Later when the downstream IngressController returns a credit for the lane, EgressController reads the EgressLaneState structure and determines that there is at least one flit waiting on credit availability.

The EgressController then determines if there is room in the FIR FIFO associated with the IngressController sourcing the FAN. If no room is available in the FIR FIFO, a WaitingForFirFifo flag is set. Subsequent actions are identical to the HeadFAN case. That is, when the IngressController extracts a FIR from the FIR FIFO, the EgressController will select a lane waiting on FIR FIFO availability, dequeue the oldest FAN of the segment assigned to the lane, construct a FIR, and store the FIR in the FIR FIFO.

Figure 15:
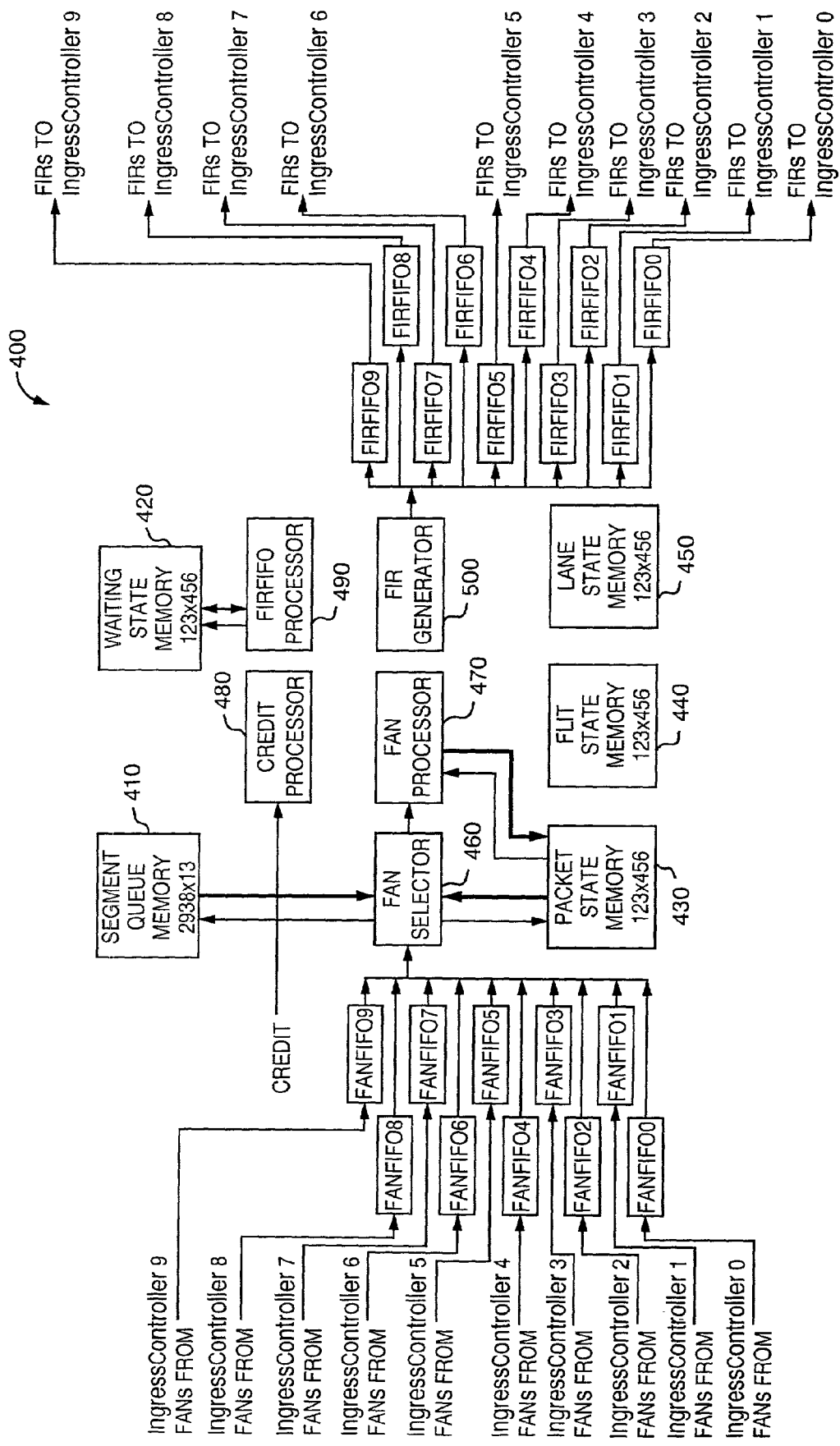
FIG. 15 illustrates the processing components and control memories of an EgressController according to one embodiment.

FIG. 15 illustrates the processing components and control memories of an EgressController according to one embodiment. FAN Selector 460 is responsible for presenting FANs to FAN Processor 470.

It performs six major functions:
(a) maintains the read and write pointer to each of the twelve FAN FIFOs associated with the EgressController;
(b) selects a FAN from one of the FAN FIFOs using a round robin by priority arbitration scheme;
(c) extracts the selected FAN whenever the Fan Processor 470 can process another FAN and updates the extraction pointers;
(d) fetches the SegmentPointer, laneQueueState and IngressPacketState structure indicated by the selected FAN;
(e) updates the fetched SegmentPointer, laneQueuetState and IngressPacketState structures when they are modified;
(f) forwards a FanExtraction credit to the IngressController associated with FAN FIFO from which it extracted a FAN to indicated space for another FAN exits in the FAN FIFO.

When FAN Processor 470 completes processing the current FAN, FAN Selector 460 presents the stored FAN structure, a FanQueuePointer structure, an Ingress- QueueState structure and the IngressPort number to FAN Processor 470. Processing of each FAN is dependent on FAN type. The following section details FAN Processor 470 operation by flit type.

Receipt of a FAN tagged as an OnlyFlit implies that the entire packet payload plus packet header fits within a single flit. Since OnlyFlits can be fat, this implies that all packets less than 80-bytes in length are forwarded across the fabric as an OnlyFlit.

Upon receipt of an OnlyFlit FAN, FAN Processor 470 first checks the SegmentPointer structure to determine whether previously arrived FANs having the same segment Identification Number (CID) are currently waiting to be converted into FIRs. If there is one or more FANs waiting on the segment, then the FAN cannot be immediately converted to a FIR. Rather, FAN Processor 470 must add the OnlyFlit FAN to the queue of packets waiting on the segment. If no other FAN is waiting on the segment, then the FAN can be immediately converted to a FIR.

After determining that there are no packets waiting on the segment, FAN Processor 470 then attempts to assign a lane from the group of lanes assigned to the particular hop that the packet will take when injected into the fabric link. For a D=3 fabric employing alternative path routing, each group contains 48 lanes. For example, if the packet arrived at the ingress port tagged as hop 2, then FAN Processor 470 will assign a lane from the group assigned to hop 1. If a lane is available, one is allocated and an EgressLaneState structure is created. If a lane is available, a FIR can be created and forwarded to the IngressController sourcing the OnlyFlit FAN if space in the associated FIR FIFO is available. If no lane is available, the FAN is stored and a WaitingForlane flag indexed by the CID is set. Later, when a lane is deallocated, the WaitingForlane array will be round robin tree searched to locate an open segment having waiting packets to assign to the lane.

If the OnlyFlit FAN can be converted to a FIR and space is available in the FIR FIFO associated with IngressController sourcing the OnlyFlit FAN, FAN Processor 470 creates a FIR, stores it in the FIR FIFO and then updates the SegmentPointer and EgressLaneState structures. If no room is available in the FIR FIFO, then FAN Processor 470 stores the FAN and sets a flag in the WaitingForFirFifo array associated with the IngressController sourcing the FAN indexed by ingress lane number. Later, when room in the FIR FIFO becomes available, the per IngressController WaitingForFirFifo array is round robin tree searched to find a FAN waiting for FIR FIFO space.

Receipt of a FAN tagged as an HeadFlit implies that the first flit of a multi-flit packet has arrived at one of the IngressControllers. Upon receipt of an HeadFlit FAN, FAN Processor 470 first checks the SegmentPointer structure to determine whether previously arrived packets having the same segment Identification Number (CIN) are currently waiting on the segment. If there is one or more packets waiting on the segment, then FAN Processor 470 must add the HeadFlit FAN to the queue of packets waiting on the segment and create a FanState structure corresponding to a HeadFlit FAN. If no other FAN is waiting on the segment, then the FAN can be immediately converted to a FIR.

After determining that there are no FANs waiting on the segment, FAN Processor 470 attempts to assign a lane from the group of lanes assigned to the particular hop that the packet will take when injected into the fabric link. If a lane is available, one is allocated and an EgressLaneState structure is created. At this point, a FIR can be created and forwarded to the IgressController sourcing the HeadFlit FAN if space in the associated FIR FIFO is available. If no lane is available, the FAN is stored and a WaitingForlanes flag indexed by the CIN is set. Later, when a lane is deallocated, the WaitingForlanes array is round robin tree sourced to select a segment having waiting packets.

If the HeadFlit FAN can be converted to a FIR and space is available in the FIR FIFO associated with IngressController sourcing the HeadFlit FAN, FAN Processor 470 creates a FIR, stores it in the FIR FIFO and then updates the SegmentPointer, FanQueuePointer and EgressLaneState structures. If no room is available in the FIR FIFO, then FAN Processor 470 queues the FAN and sets a flag in the WaitingForFirFifo array associated with the IngressController sourcing the FAN indexed by lane number.

Receipt of a FAN tagged as a BodyFlit implies that the HeadFlit of a multi-flit packet previously arrived at one of the IngressControllers and resulted in the creation of a FanQueuePointer entry. A BodyFlit FAN can be immediately converted into a FIR if the Head-Flit of the same packet and all previously arrived BodyFlits of the packet have been converted to FIRs. If the HeadFlit of the same packet is queued waiting on the segment, the BodyFlit FAN is stored. If the HeadFlit of the same packet was converted to a FIR but there are one or more previously arrived BodyFlits waiting to be converted to FIRS, the newly arrived BodyFlit FAN is stored.

If the BodyFlit is to be stored, then FAN Processor 470 must add the BodyFlit FAN to the queue of flits associated with the same packet. Note, that because a HeadFlit FAN of the same packet was previously processed, the packet was already linked into the queue of packets waiting on the segment. Processing of a BodyFlit FAN does not change this packet linking, it only adds a BodyFlit FAN to the queue of flits associated with the same packet.

After determining that the HeadFlit and all previously arrived BodyFlit FANs have been converted to FIRs, FAN Processor 470 checks the laneState credit count to determine whether one more flit can be forwarded using the assigned lane. If no credits are available, the BodyFlit FAN is stored. If a credit is available, a FIR can be created and forwarded to the IngressController sourcing the BodyFlit FAN if space in the associated FIR FIFO is available. Note that if no credit is available, no further action is required because when a Credit is returned from the downstream IngressController, Credit Processor 480 will check if there are any BodyFlits waiting.

If the BodyFlit FAN can be converted to a FIR and space is available in the FIR FIFO associated with IngressController sourcing the BodyFlit FAN, FAN Processor 470 creates a FIR, stores it in the FIR FIFO and then updates the FanQueuePointer and EgressLaneState structures. If no room is available in the FIR FIFO, then FAN Processor 470 queues the FAN and sets a flag in the WaitingForFirFifo array.

Receipt of a FAN tagged as a TailFlit implies that the HeadFlit and all BodyFlits of a multi-flit packet have previously arrived at one of the IngressControllers. A TailFlit FAN can be immediately converted into a FIR if the HeadFlit of the same packet and BodyFlits of the same packet have been converted to FIRs. If the HeadFlit of the same packet is queued waiting on the segment, the TailFlit FAN is stored. If the HeadFlit of the same packet was converted to a FIR but there are one or more previously arrived BodyFlits waiting to be converted to FIRs, the newly arrived TailFlit FAN is stored. If the TailFlit is to be stored, then FAN Processor 470 must add the TailFlit FAN to the queue of flits associated with the same packet. Note, that because a HeadFlit FAN of the same packet was previously processed, the packet was already linked into the queue of packets waiting on the segment.

After determining that the HeadFlit and all previously arrived BodyFlits FANs have been converted to FIRs, FAN Processor 470 checks the laneState credit count to determine whether one more flit can be forwarded using the assigned lane. If no credits are available, the TailFlit FAN is stored. If a credit is available, a FIR can be created and forwarded to the IngressController sourcing the TailFlit FAN if space in the associated FIR FIFO is available.

If the TailFlit FAN can be converted to a FIR and space is available in the FIR FIFO associated with IngressController sourcing the TailFlit FAN, FAN Processor 470 creates a FIR, stores it in the FIR FIFO and then updates the SegmentPointer and EgressLaneState structures. If no room is available in the FIR FIFO, then FAN Processor 470 queues the FAN and sets a flag in the WaitingForFirFifo array associated with the IngressController sourcing the FAN indexed by lane number.

When a FAN cannot be immediately converted into a FIR, it is stored either in the dedicated or shared FanState memory and linked together with previously arriving FANs of the same packet or previously arriving packets waiting on a segment. There are three conditions causing a FAN to be stored:

(a) One or more stored FANs must be injected out the switch egress port before the newly arrived FAN;
(b) When the FAN is a HeadFan or OnlyFan, a lane must be assigned to the packet but none is available;
(c) The FAN could be immediately converted into a FIR but no room exists in the FIR FIFO.

Regardless of FAN type, an available FanState register in dedicated or shared FanState memory must be allocated and the synthesized FAN structure stored into the register. Updating the various control structures depends on FAN type as detailed in the following sections.

The EgressController architecture employs forward pointers. That is, if a linked list of structures exist, each earlier created structure contains a pointer to the next later created structure. Linking FanState structures occurs both at the inter packet and intra packet level.

At the inter packet level, the FanState structure of a packet contains a pointer to the FanState structure of the next packet (if it exists). The segmentQueue structure contains a pointer to the first FanState structure of the oldest packet waiting on the segment and a pointer to the first FanState structure of the youngest packet waiting on the segment.

At the intra packet level, each FanState structure contains a pointer to the next FanState structure of the same packet. This allows maintaining the order of FANs within a packet. When an OnlyFan is stored, NextFan (13 bits)—pointer to next FAN in the same lane;
Nextlane (13 bits)—pointer to the next lane waiting on segment resources;
IngressPort (4 bits)—index of the ingress port receiving the flit;
FlitBufAdr0 (9 bits)—address of the Input Flit Buffer holding the first 48-bytes of the flit;
FlitBufAdr1 (9 bits)—address of the Input Flit Buffer holding the remaining bytes of a fat flit;
FlitType (3 bits)—type of flit;
FlitSize (2 bits)—size of flit (48, 60, 72, 84 bytes)

Credits are created and forwarded upstream by a downstream node as its IngressController extracts a flit from its Input Flit Buffer memory and forwards the flit downstream. It is expected that an IngressController shall extract a flit from its Input Flit Buffer at a maximum rate of one flit every two clock cycles.

Each 48-bit Credit message forwarded upstream can specify that one or two flits have been extracted from the Input Flit Buffer and forwarded downstream. This implies that the credit forwarding rate is equal to or greater than the maximum Input Flit Buffer flit extraction rate. Thus no Credit FIFO is needed as was the case with previous generation switch architectures.

Each Credit received by the upstream EgressController indicates that a downstream flit buffer has been emptied and that a particular lane should be credited with an opportunity to forward another flit. The 11-bit Credit contains the following fields:

laneNumber (8 bits)—indicates the particular lane to which a Credit is issued;
TailCredit (1 bits)—indicates that the credit is for the last flit of the packet;
PoolBuffer (1 bits)—indicates that the downstream Input Flit Buffer was a pool buffer rather than a buffer dedicated to the lane;
FatFlit (1 bits)—indicates that the credit is releasing two downstream Input Flit Buffers because the forwarded flit was fat.

Credit Processor 480 is the EgressController module which first processes each incoming Credit. Its first action is to fetch the EgressLaneState structure indexed by the Credit's laneNumber. Each EgressLaneState structure contains the following fields:

AvailablePoolBuffers (3 bits)—number of downstream Input Flit Buffers from the pool of buffers shared by all lanes available to the lane;
AvailableDedicatedBuffers (2 bits)—number of downstream Input Flit Buffers dedicated to this lane that are currently unfilled;
segment (12 bits)—segment Identification Number of segment assigned to the lane. A segment value of 0x fff indicates that the lane can be allocated to a packet.
FanWaiting (1 bits)—flag indicates that there is one or more FANs waiting to be converted to FIRs as soon as credits are available.

Receipt of a Credit either causes a waiting FAN to be immediately converted into a FIR or an update of the control structures to allow a future arriving FAN to be immediately converted into a FIR at the time it arrives. The first action of Credit Processor 480 on receipt of a Credit is to fetch the EgressLaneState structure indexed by the Credit's laneNumber. The segment field of a EgressLaneState structure is updated by the FAN Processor 470 when it assigns a lane to the oldest packet queued on a particular segment. Worst case access bandwidth of the segment field is one write every four clock cycles and a read every two cycles. The FanWaiting flag is set or cleared by FAN Processor 470 and read. The fabric link protocol does not provide a backpressure mechanism for credits. Accordingly, there can be long periods of time where a new Credit is received every other clock period. Since the FAN to FIR conversion rate was established at one Credit every four clock cycles, a mechanism can be implemented for queueing the Credits for later processing during periods when the arrival rate is too high. The order in which queued Credits are processed normally does not matter except for Credits associated with the last flit of the packet (i.e. the TailCredit).

If FIR FIFO unavailability was the reason the conversion test failed, a flag is also set in the WaitingForFirFifo array. Later, when a FIR FIFO entry becomes available, the EgressController will dequeue a FlitState structure, convert it to a FIR and then store it in the non-empty FIR FIFO.

If credit unavailability was the reason the conversion test failed, no further action is required because sometimes later a credit message will arrive from the downstream node's IngressController indicating the availability of another credit. When the credit arrives, the EgressController will attempt to convert the oldest queue FAN into a FIR.

The conversion is guaranteed to be successful unless the IngressController's FIR FIFO is full. Note that there are 12 WaitingForFirFifo arrays per EgressController, one for each of the IngressControllers. With WaitingForFirFifos per IngressController, congestion at one IngressController does not cause other uncongested IngressControllers to stall because they have insufficient FIRs to process.

Credit messages received from the downstream node's IngressController also initiate EgressController tasks. Each credit includes an 7-bit lane Identification Number indicating which lane is to be credited. The receipt of credit is referred to as a CreditNotificaion (CN). Receipt of a FAN or CN causes the EgressController to first lookup a SegmentPointer structure from the SegmentPointer memory and then make a determination of whether a flit should be forwarded or not. If a flit is to be forwarded, the EgressController will create a FlitInsertionRequest (FIR) and forward it to the FirAgent module associated with the InBuf memory holding the flit. Regardless of whether a flit is forwarded or not, receipt of a FAN or CN always causes the EgressController to update the SegmentPointer structure.

The SegmentPointer memory holds 1,280 SegmentPointer structures, one for each virtual segment managed by the EgressController. Each SegmentPointer structure holds the state of the segment (i.e. Scrub, Priority, & ChState fields), the state of the packet currently scheduled to utilize the segment (i.e., TailRcvd, Flits-Queued, SrcPort, FirState), the state of the downstream buffers (i.e., Credits), and the state of each of the seven input ports which can source a packet to be forwarded over the virtual segment (i.e., HdStatej, j=0, . . . 6). Each 3-bit HdState structure is composed of a count of the number of flits of the packet currently in the IBuf memory and a flag indicating whether the tail flit is in the InBuf memory.

Current fields within each 35-bit SegmentPointer structure are:
Scrub (2 bits)—used to determine when no flits have traversed the virtual segment for some period of time.
Priority (2 bits)—priority of virtual segment
ChState (2 bits)—State of the segment.
TailRcvd (1 bits)—tail of packet currently in source buffer.
FlitsQueued (2 bits)—Number of flits in source buffer (0, 1, 2, 3 are allowed values)
SrcPort (3 bits)—specifies the input port sourcing the packet currently being forwarded or the input port of the last forwarded packet.
HdState0, HdState1, HdState2, HdState3, HdState4, HdState5, HdState5
(21 bits)—State of flits waiting for use of the virtual segment.
Credits (2 bits)—number of flits buffers in the associated downstream input buffer which are available to receive flits.

Each SegmentPointer structure maintains sufficient state to forward flits of the currently scheduled packet and contains the complete state of flits of waiting packets from each of the seven input ports. When the EgressController creates a FIR for the currently scheduled packet's tail flit, it will arbitrate amongst all inputs (i.e., by examining the HdState flags) to Header a waiting packet packet to schedule.

The EgressController's function is to process arriving FAN and CN events and produce FlitInsertionRequest (FIRs). The head flit of a packet is only forwarded when no flits of the previously forwarded packet are present in a downstream buffer. Thus a head flit is forwarded only when the credit count equals three. Non head flits are forwarded whenever the credit count is non-zero. If a flit is waiting for the availability of a downstream buffer, receipt of a CN will trigger the creation of a FIR. If no flits are waiting, the receipt of a CN causes the Credits counter to be incremented.

A particular virtual segment can be in one of three states:
ChState=00—the segment is idle, the tail flit of the last scheduled packet has been forwarded and no packets are waiting in any of the input buffers.
ChState=01—a waiting packet has been sourced from one of the input ports and the OutputController is waiting for the tail flit of the previously transmitted packet to be removed from the downstream InBuf memory.
ChState=1x—the head of the packet has been forwarded and the EgressController is waiting for bodies and the tail of the packet to forward.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network for interconnecting devices external to the network, comprising:
   a plurality of switching nodes interconnected by links forming a Gamma graph interconnection network;
   a plurality of devices coupled to the network via a plurality of ports; and
   a plurality of buses, each switching node coupled to at least one of the plurality of buses, each bus capable of supporting a configurable number of ports, the bandwidth of a port being inversely proportional to the number of ports configured per bus.

2. The network of claim 1, wherein each switching node comprises:
   a switch;
   at least one traffic manager coupled to the switch;
   the traffic manager receiving data packets from one or more devices and forwarding at least portions of the packets into the interconnection network, the traffic manager buffering data packets in memory coupled to the traffic manager, the traffic manager receiving at least portions of data packets from the switch and forwarding the data packets out of the interconnection network to the one or more devices;
   the switch coupled to switches of adjacent switching nodes by links fanning in and out of the switch according to a set of Gamma graph adjacency rules, the switch forwarding at least portions of data packets to the at least one traffic manager or to switches of adjacent switching nodes.

3. The network of claim 2, wherein each of the plurality of buses are coupled to the switching nodes by a traffic manager, the traffic manager transporting data packets from the one or more devices.

4. The network of claim 3, further comprising
   at least one application specific module (ASM) providing an interface between at least one device and the switching node, the ASM transporting data packets from the at least one device to the bus.

5. The network of claim 4, wherein the application specific module couples to a device providing data, data processing, or data storage.

6. The network of claim 4, wherein the application specific module (ASM) is a network interface card.

7. The network of claim 6, wherein the network interface card is an Ethernet network interface card.

8. The network of claim 6, wherein the network interface card is an ATM network interface card.

9. The network of claim 4, wherein the application specific module (ASM) is a processor module.

10. The network of claim 4, wherein the application specific module (ASM) is a WAN interface card.

11. The network of claim 4, wherein the application specific module (ASM) is a POS interface card.

12. The network of claim 4, wherein the application specific module (ASM) is an Infiniband™ interface card.

13. The network of claim 1, wherein the plurality of buses are Infiniband™ buses.

14. The network of claim 1, wherein the plurality of buses are capable of supporting one or more logical data channels per port configured.

15. The network of claim 14, wherein the one or more logical data channels are Infiniband™ lanes.

16. A network for interconnecting devices external to the network, comprising:
a plurality of switching nodes interconnected by links forming a Gamma graph interconnection network having a diameter (D) and a radix ($\Delta$), the radix greater than the diameter, the interconnection network being link fault tolerant by providing $\Delta-1$ alternative paths between any two devices, packets alternatively routed between at least two devices over one of the $\Delta-1$ paths through the interconnection network having a hop distance greater than the diameter; and
a plurality of devices coupled to the network via a plurality of ports.

17. A network for interconnecting devices external to the network, comprising:
a plurality of switching nodes interconnected by links forming a Gamma graph interconnection network, wherein each switching node is interconnected to a subset of adjacent switching nodes, each switching node having a bidirectional interconnection with one of the adjacent switching nodes with the remaining interconnections being primarily unidirectional; and
a plurality of devices coupled to the network via a plurality of ports.

18. The network of claim 17, wherein the Gamma graph interconnection network comprises:
six or more interconnected switching nodes;
at least one device coupled to each switching node via ports; and
at least one logical data channel supported per port.

19. A network for interconnecting devices external to the network, comprising:
a plurality of switching nodes interconnected by links forming a Gamma graph interconnection network having a diameter (D) and a radix ($\Delta$), the radix greater than the diameter;
a plurality of devices coupled to the network via ports; and
the interconnection network being link fault tolerant by providing $\Delta-1$ alternative paths between any two devices, packets alternatively routed between at least two devices over one of the $\Delta-1$ paths through the interconnection network having a hop distance greater than the diameter.

20. A network for interconnecting devices external to the network, comprising:
a plurality of switching nodes interconnected by links forming a Gamma graph interconnection network, each switching node interconnected to a subset of adjacent switching nodes, each switching node having a bidirectional interconnection with one of the adjacent switching nodes with the remaining interconnections being primarily unidirectional;
a plurality of devices coupled to the network via ports; and
packets routed among the plurality of devices by traversing one or more hops across the links.

* * * * *